(12) United States Patent
Kerrebrock et al.

(10) Patent No.: US 6,502,657 B2
(45) Date of Patent: Jan. 7, 2003

(54) TRANSFORMABLE VEHICLE

(75) Inventors: Peter A. Kerrebrock, Hingham, MA (US); Robert Larsen, Medford, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 0 days.

(21) Appl. No.: 09/808,195

(22) Filed: Mar. 14, 2001

(65) Prior Publication Data

US 2002/0036104 A1 Mar. 28, 2002

Related U.S. Application Data

(60) Provisional application No. 60/234,831, filed on Sep. 22, 2000.

(51) Int. Cl.$^7$ .............................................. B62D 61/00
(52) U.S. Cl. ........................ 180/218; 180/6.5; 280/205; 280/638; 280/63; 446/454
(58) Field of Search .................... 180/218, 8.1, 8.7, 180/7.1, 6.2, 6.48, 6.5, 20, 906; 280/205, 208, 638, 63, 42; 152/1, 5, 7, 11, 12; 446/236, 237, 431, 436, 448, 454, 456, 457

(56) References Cited

U.S. PATENT DOCUMENTS

| | | | | |
|---|---|---|---|---|
| 3,237,885 A | * | 3/1966 | Mohar | 180/21 |
| 3,590,897 A | * | 7/1971 | Bragdon | 152/112 |
| 4,648,853 A | * | 3/1987 | Siegfried | 180/7.1 |
| 4,773,889 A | | 9/1988 | Rosenwinkel et al. | |
| 4,897,070 A | * | 1/1990 | Wagstaff | 180/6.5 |
| 5,769,441 A | | 6/1998 | Namngani | |
| 6,066,026 A | | 5/2000 | Bart et al. | |
| 6,119,882 A | * | 9/2000 | Crook et al. | 180/906 |
| 6,247,546 B1 | * | 6/2001 | Spletzer et al. | 180/8.5 |
| 2002/0011368 A1 | * | 1/2002 | van den Berg | 180/218 |

FOREIGN PATENT DOCUMENTS

| | | |
|---|---|---|
| GB | 2194457 A | 3/1988 |
| JP | 5-8167263 | 10/1983 |

OTHER PUBLICATIONS

Ichikawa, Y. and Okido F., *One–Dimensional Self–Reproducing Robot, IEEE*, U.S., vol. 1, Conf. 17 (Oct. 28, 1991), pp. 963–966.

SuBot, Small Unit Robot [online]. Science Applications International Corporation, Center for Intelligent Systems, 1999 [retrieved on Sep. 15, 2000]. Retrieved from the Internet: <URL: http://www.cis.saic.com/projects/subot/index.html>.

Micro Unattended Mobility System (MUMS), Making Unattend Sensor Systems Mobile [online], iRobot Corporation [retrieved on Sep. 15, 2000]. Retrieved from the Internet: <URL: http://www.irobot.com/rd/research_mums.htm>.

Fractal Robots, Photographs of a Modular Vehicle [online]. Insitut Autonome Intelligente Systems (AIS) [retrieved on Jul. 7, 2001]. Retrieved from the Internet: <URL: http://ais.gmd.de/BAR/Kurt/kurtfrac.htm>.

Remote Control "Motor Ball" All Electronics Corporation [online]. [retrieved on Sep. 13, 2000]. Retrieved from the Internet: <URL:http://www.allelectronics.com/cgi–bin/category.cgi?category=search&item=MB–360A&type=store.htm>.

* cited by examiner

*Primary Examiner*—Kevin Hurley
(74) *Attorney, Agent, or Firm*—Testa, Hurwitz & Thibeault, LLP

(57) ABSTRACT

The transformable vehicle comprises a central chassis assembly having first and second distal ends with an axis passing therebetween, a first wheel assembly mounted to the first distal end, and a second wheel assembly mounted to second distal end. A multifunction transformable vehicle comprising at least two configurational states: a stowed state and a transformed state. In the stowed state, the transformable vehicle comprises a compact structure suitable for storage, transport or deployment. During transition from the stowed state to the transformed state, the first and second wheel assemblies move longitudinally outward along the axis to reveal the central chassis assembly.

41 Claims, 34 Drawing Sheets

TRANSFORMABLE VEHICLE

CROSS-REFERENCE TO RELATED APPLICATION

This application claims priority to U.S. Ser. No. 60/234,831 filed Sep. 22, 2000, the content of which is incorporated herein by reference.

GOVERNMENT RIGHTS IN THE INVENTION

This invention was made with government support under Amendment P00009 to Contract No. DAAE07-98-CL035 awarded by the Defense Advanced Research Projects Agency (DARPA). The government may have certain rights in the invention.

FIELD OF THE INVENTION

The invention is generally directed to robotic vehicles and more particularly to transformable robotic vehicles.

BACKGROUND OF THE INVENTION

Conventional robotic ground vehicles typically employ a single chassis supported on at least two (but often more) wheels, legs, tracks or the like. Such conventional vehicles suffer from a number of disadvantages. One such disadvantage is that the physical dimensions of the vehicle limit the size of obstacles that it can negotiate. Typically, conventional vehicles are also too large and heavy for practical deployment by throwing or hand held launchers. In addition, conventional vehicles are generally not rugged enough to survive deployment by throwing or launching.

SUMMARY OF THE INVENTION

The invention provides a multipurpose, rugged, light weight, ground or water transformable vehicle with improved mobility performance compared to conventional vehicle architectures commonly used for this class of vehicles. The transformable vehicle of the invention has at least two configurational states, a stowed state and a transformed state (also referred to as a deployed state). In the stowed state, the transformable vehicle is generally more compact, rugged, less observable, and more conducive to storage, transport and deployment than in the transformed state. In one embodiment, the vehicle is substantially spherical in the stowed state. It is to be understood, however, that the a spherical or symmetric shape in the stowed state is not critical to the invention. For example, the transformable vehicle may be substantially oblate spherical, substantially cylindrical or substantially rectangular in the stowed state.

In some embodiments, the transformable vehicle may be launched or thrown; may operate on ground terrain, a water surface, or underwater; may assemble with other transformable vehicles into a single larger vehicle and subsequently disassemble back into single vehicles. In other embodiments, the vehicle is wheeled. In these embodiments, the wheeled vehicle may modify its wheels shape and size to enable locomotion, to tailor its wheels to the terrain over which it is traveling, or both. In still further embodiments, vehicles of the invention wirelessly link to provide a mobile and reconfigurable communication relay chain.

The transformable vehicle comprises a central chassis assembly, a first wheel assembly and a second wheel assembly. The central chassis assembly has first and second distal ends. It is to be understood that the chassis contains the usual necessary components of a vehicle. Examples of such components include, but are not limited to, batteries, engines and/or motors. The first wheel assembly mounts to the first distal end and the second wheel assembly mounts to the second distal end of the chassis assembly. The first and second wheel assemblies are adapted to move along an axis passing through the first and second distal ends from a stowed state to a transformed state. The wheel assemblies enable locomotion of the transformable vehicle. A wheel assembly of the invention can comprise any suitable structure for locomotion over land, water, or both. Suitable structures include, but are not limited to, flexible wheels, rigid wheels, inflated wheels, tracks, articulating projections, and paddle wheels. However, hereinafter for the sake of conciseness, the wheel assembly locomotion structures will be referred to generally as wheels.

Any suitable structure may be used to move the first and second wheel assemblies along an axis passing through the first and second distal ends from a stowed state to a transformed state. In one embodiment, the transformable vehicle includes at least one spring adapted to oppositely bias the first and second wheel assemblies along the axis from the stowed state to the transformed state. In another embodiment, the transformable vehicle includes a motor assembly for retracting and/or extending the wheel assemblies between the stowed and transformed states.

In one embodiment, the first and second wheel assemblies of the transformable vehicle further include first and second outer shell assemblies, respectively, that are adapted to overlay the central chassis assembly when the vehicle is in the stowed state. In one embodiment, the first and second outer shell assemblies are substantially hemispherical.

In accordance with further embodiments of the invention, the central chassis of the transformable vehicle includes a transceiver, sensors, cameras, audio speakers, microphones, on-board logic, sonar, proximity sensors, gyroscope, wheel encoders, and/or other electronics. In one embodiment, the central chassis includes a payload bay which may hold, for example, grappling hook and motorized winch assembly, additional sensors, medical supplies, munitions, ordinance, or any other item a user may wish to transport within the transformable vehicle. In another embodiment, the payload bay holds a water propulsion unit, for example, a jet or propeller, for water surface or submersible locomotion.

In one embodiment, the first and second wheel assemblies are rotatably mounted to the first and second distal ends of the central chassis assembly. In another embodiment, the transformable vehicle further includes a drive motor assembly which enables steerable locomotion of the vehicle. In another embodiment, the transformable vehicle further includes at least two separate drive motors individually mated to each of the wheel assemblies enabling steerable locomotion.

In one embodiment, each of the wheel assemblies are fitted with a plurality of spines that transform from an initial position proximate to the first and second wheel assemblies in the stowed state to a position radially extended from the first and second wheel assemblies in the transformed state. The spines may be rigid, semi-rigid or flexible. In another embodiment, the spines include a spring bias adapted to bias the plurality of spines in a radially extended position that characterizes the transformed state. In another embodiment, the first and second plurality of spines are further adapted to extend and retract by operation of a spine control motor assembly or similar means.

In one embodiment, the transformable vehicle controls the extension and retraction of the first and second plurality of spines to enable the transformable vehicle to locomote. In another embodiment, the transformable vehicle extends and retracts the spines in a predetermined pattern to develop a rotational torque between the first and second plurality of spines.

In one embodiment, the transformable vehicle uniformly extends and retracts at least one of the first and second plurality of spines to effect a variable wheel diameter. In another embodiment, the plurality of spines are further adapted to extend or retract to conform to a terrain profile over which the transformable vehicle is travelling. The first and second plurality of spines may be further adapted to flex to adapt to the terrain profile.

In one embodiment, the transformable vehicle further includes a tail assembly attached to the central chassis assembly to provide a reaction torque to the differential drive torque developed between the central chassis assembly and the first and second wheel assemblies. The tail assembly of the transformable vehicle may also include a tail weight which is attached to the distal end of the tail assembly. In another embodiment, the transformable vehicle further includes a grappling hook and the tail assembly includes a distal end adapted for attachment to the grappling hook. In another embodiment, the central chassis further includes a motorized winch assembly connected to a tail assembly with a distal end adapted for attachment to a grappling hook. The motorized winch assembly enables the transformable vehicle to be suspended, raised and lowered from elevated surfaces or structures via a cable connecting the tail assembly and the chassis of the transformable vehicle.

In another embodiment, the transformable vehicle may assemble with one or more comparable transformable vehicles, to form a single larger vehicle. This assemblage of two or more transformable vehicles is referred to as an "assembled state" of the transformable vehicle. This assemblage may occur manually or remotely. In one embodiment, the transformable vehicles locate each other and attach such that the chassis of a first transformable vehicle flexibly or rigidly connects to the end of the tail assembly of a second transformable vehicle directly in front of the first transformable vehicle. The described single larger vehicle offers improved stability, mobility performance and is capable of surmounting larger obstacles because the second transformable vehicle is pushed up the obstacle by the first transformable vehicle. In another embodiment, transformable vehicles coupled into an assembled state may disassemble into one or more individual transformable vehicles.

In another embodiment, multiple transformable vehicles are in wireless communication and can be spaced apart in a communications "train" or "chain" to serve as an extendable wireless communications relay for maintaining communications among an operator's base control station and two or more transformable vehicles without continuous line-of-sight comminations.

BRIEF DESCRIPTION OF THE DRAWINGS

The invention is pointed out with particularity in the appended claims. A fuller understanding of the nature and objects of the invention may be had by reference to the following illustrative description, when taken in conjunction with the accompanying drawings in which:

DESCRIPTION OF ILLUSTRATIVE EMBODIMENTS

Figure 1:
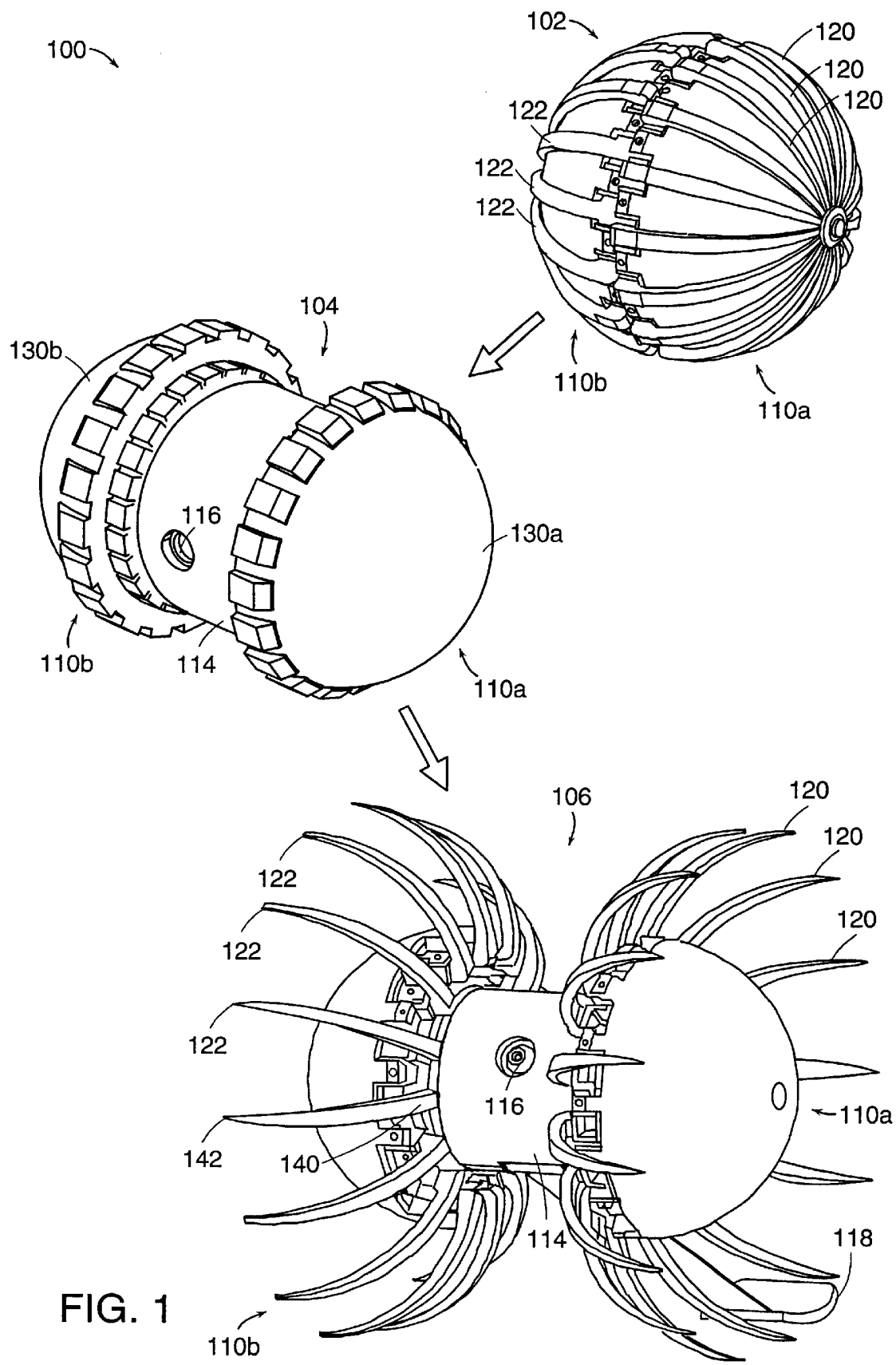
FIG. 1 schematically illustrates the transformable vehicle in a progression of configurational states from stowed to fully transformed.

As briefly described above, the invention provides a rugged, light weight ground or water transformable vehicle with improved mobility performance compared to conventional vehicle architectures commonly used in robotic vehicles. Throughout the discussion of the illustrative embodiments, it is to be understood that in the figures, like reference characters generally refer to the same parts throughout the different views.

Referring to FIG. 1, the transformable vehicle comprises a first wheel assembly 110a, a second wheel assembly 110b (hereafter collectively referred to as 110), and a central chassis assembly 114. Generally, movable wheel assemblies 110 enable transformation of the vehicle from a stowed state 102 to a transformed state 106. In one embodiment, the central chassis assembly 114 may comprise a tail assembly 118 and may further comprise a mission objective element 116, such as a camera, optical sensor, audio speaker, microphone, sonar, proximity sensors, gryroscope, transceivers, antennae, on-board logic and/or other electronics. In one embodiment, the central chassis assembly 114 includes at least one drive motor assembly and battery. In another embodiment, the central chassis assembly 114 includes a payload bay which may house ancillary components such as cameras, medical supplies, munitions, ordinances, additional sensors, or a grappling hook and motorized winch assembly.

A wheel assembly 110 of the invention can comprise any suitable wheel structure for locomotion over land, water, or both. The wheel assemblies enable locomotion of the transformable vehicle. Suitable wheels structures include, but are not limited to, flexible wheels, rigid wheels, inflated wheels, tracks, articulating projections, and paddle wheels. Referring to FIGS. 1–5, in the illustrative embodiment illustrate wheel assemblies 110 are rotatably attached to first and second distal ends of the central chassis assembly 114. In one embodiment, wheel assemblies 110 are rigid and substantially hemispherical. In other embodiments, the wheel assemblies may be flexible, semi-rigid inflated, and/or comprise tracks. In one embodiment, the wheel assemblies comprise wheels with the first wheel assembly having a first plurality of spines 120 and the second wheel assembly having a second plurality of spines 122. In one embodiment, the transformable vehicle is capable of locomotion by articulating a succession of spines 120, 122 thus obviating the need for rotation of wheel assemblies 110 to locomote. In another embodiment, the vehicle can combine the rotational motion of wheel assemblies 110 and the articulation of spines 120, 122 to locomote.

In one embodiment, the transformable vehicle is capable of locomotion with variable wheel geometry. The variable wheel geometry effects a rapid change in the effective diameter of at least one wheel assembly 110. With such an arrangement, the transformable vehicle can maintain a lower center of gravity, improve the traction of the spines 120, 122 and overall stability of the vehicle. In another embodiment, the variable wheel geometry further provides, in effect, a continuously variable transmission with variable gear ratio determined by the effective wheel diameter. The variable wheel geometry further provides a method of steering the transformable vehicle. In one embodiment the transformable vehicle is steered by controlling a difference in the effective wheel diameter of the two wheels. In one embodiment, the transformable vehicle effects a variable wheel geometry by articulating a succession of spines to enable locomotion. In this manner, by making the effective diameter of one wheel smaller or larger than that of another, the vehicle may be steered. In another embodiment, the transformable vehicle effects a variable wheel geometry by extending andlor retracting spines. In another embodiment, the variable geometry wheel is attained by inflatable wheels.

In another embodiment, the transformable vehicle effects a variable wheel geometry by deploying a multiplicity of spines that project radially outward. The spines can be of any suitable shape and comprised of any suitable material. Accordingly, it is to be understood that the spines are not required to be curved and pointed as, for example, illustrated in the illustrative embodiments of FIG. 1. For example, in one embodiment the spines may be blunt. In another embodiment, the spines may be paddle shaped to provide surface water mobility, submersible water mobility, and/or enhanced mobility over surfaces such as, for example, gravel, sand, snow and/or mud. In another embodiment, the wheel assemblies 110 may further comprise mobility or traction enhancing elements. Suitable mobility or traction enhancing elements include, but are not limited to knobs, ridges, spikes and spines.

The spines allow the effective diameter and shape of the wheels to be adjusted as needed or desired. The position of the spines can be controlled by the user or by the vehicle itself. The spines may be deployed by a number of methods including, but not limited to, hinging them at one end, or by sliding radially outward. The spines can be extended and/or retracted by any suitable method and mechanism. In one embodiment, a spine is extended and/or retracted by pivoting the spine about a hinge on one end of the spine with a spine pivoting mechanism. The spine pivoting mechanism may pivot a single spine, a group of spines or all the spines. Further, an individual spine pivoting mechanism may be provided for each spine, for one or more groups of spines or a single spine pivoting mechanism may control all the spines. In another embodiment, a spine is extended and/or retracted by sliding the spine in and out of the chassis and/or wheel with a spine sliding mechanism. The spine sliding mechanism may slide a single spine, a group of spines or all the spines. Further, an individual spine sliding mechanism may be provided for each spine, for one or more groups of spines or a single spine sliding mechanism may control all the spines. The spine pivoting mechanism and/or spine sliding mechanism may comprise a one or more motors.

For example, the spines can be extended to provide high ground clearance, improved traction, and improved sensor field-of-view on surfaces such as grass. The spines can be retracted to give high bearing area on soft surfaces such as sand or snow. The spines can retract cyclically to allow more than one spine on each wheel to be in contact with the ground at any one time, to enlarge the weight bearing surface and thus improve traction. When traversing a slope, the spines on the up-hill wheel can be partially retracted to keep the main axis of the vehicle level. This is advantageous for sensor view, and can prevent vehicle roll-over. By retracting the spines while climbing a grade the vehicle can in effect "downshift" to a "lower gear," allowing the motors to run at higher speed and potentially more efficiently. Conversely, if it were desirable for the vehicle to sprint, the spines can be fully deployed, allowing the vehicle to run in "high gear."

In one embodiment, a suitable flexible fabric can be wrapped around each wheel assembly individually in a manner that permits full expansion and/or retraction of the spines, but also minimize the possibility of fouling, catching, or locking the spines with, for example, underbrush, vegetation, and/or debris, as it drives with its spines expanded. Suitable flexible fabrics are known to those of ordinary skill in the art and include, but are not limited to lycra and nylon.

In another embodiment, the wheel assemblies 110 further comprise substantially hemispherical outer shell assemblies 130, and in another embodiment, may further comprise spines 120, 122 that generally conform to the outer contours of outer shells 130. Although the outer shells 130 are substantially hemispherical in the illustrative embodiment, suitable shapes may include, but are not limited to conical, oblate spheroidal, cylindrical, and rectangular outer shells.

Referring again to FIG. 1, one embodiment of the transformation from the stowed state to the deployed state is schematically illustrated. Once deployed or during deployment, the transformable vehicle 100 transforms from a stowed state 102 to a transformed state 106 through an intermediate state 104. An illustrative embodiment of the transformed state 106 is depicted in greater detail in FIG. 2 and an illustrative embodiment of the stowed state 102 is depicted in greater detail in FIG. 3. Further illustrations of embodiments of states intermediate between the stowed state and transformed states are presented in FIGS. 9–13 discussed below.

Figure 2:
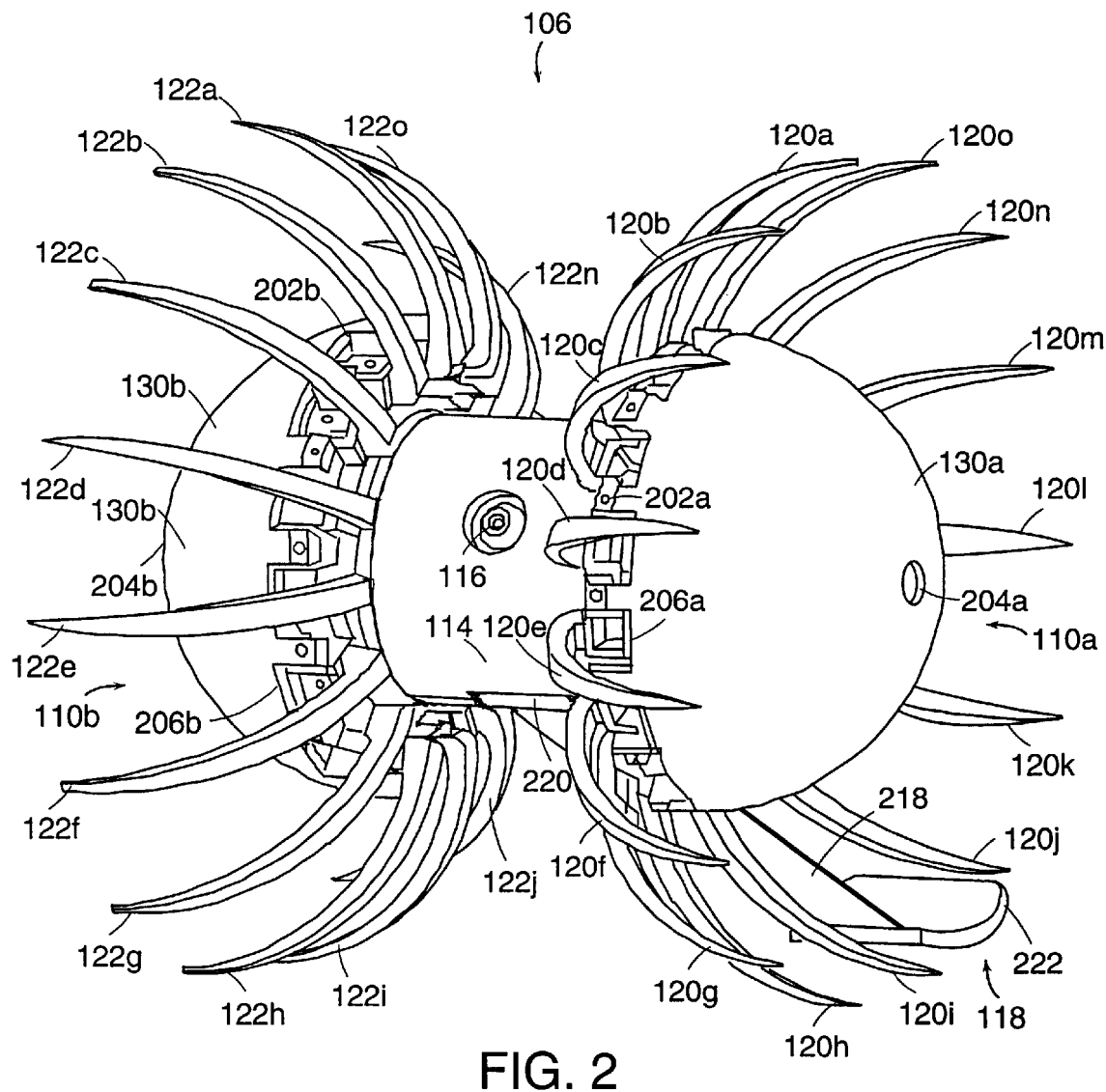
FIG. 2 is a front isometric view of the transformable vehicle of FIG. 1 in a transformed state according to an illustrative embodiment of the invention.
Figure 3:
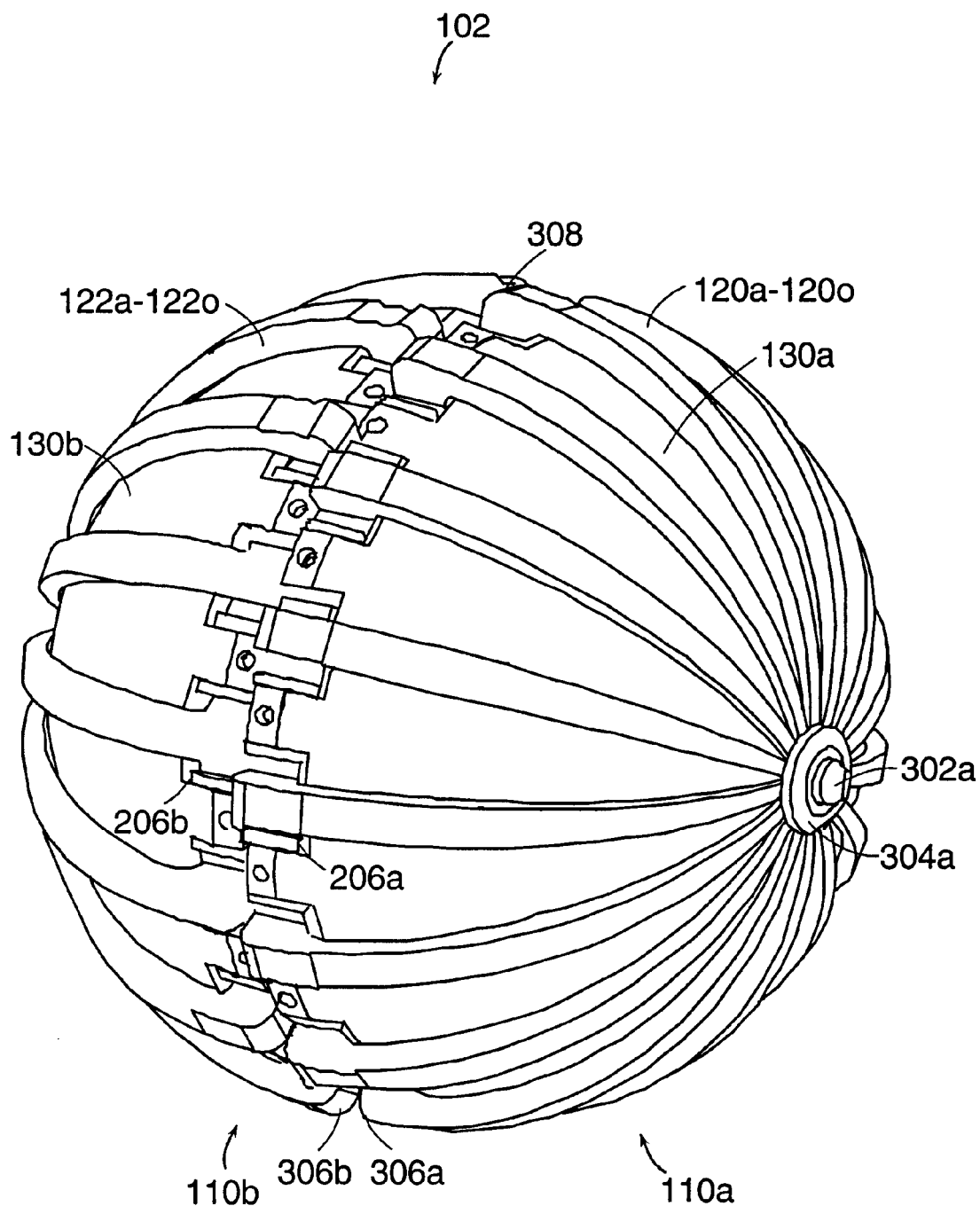
FIG. 3 is a front isometric view of the transformable vehicle of FIG. 1 in a stowed state according to an illustrative embodiment of the invention.
Figure 4:
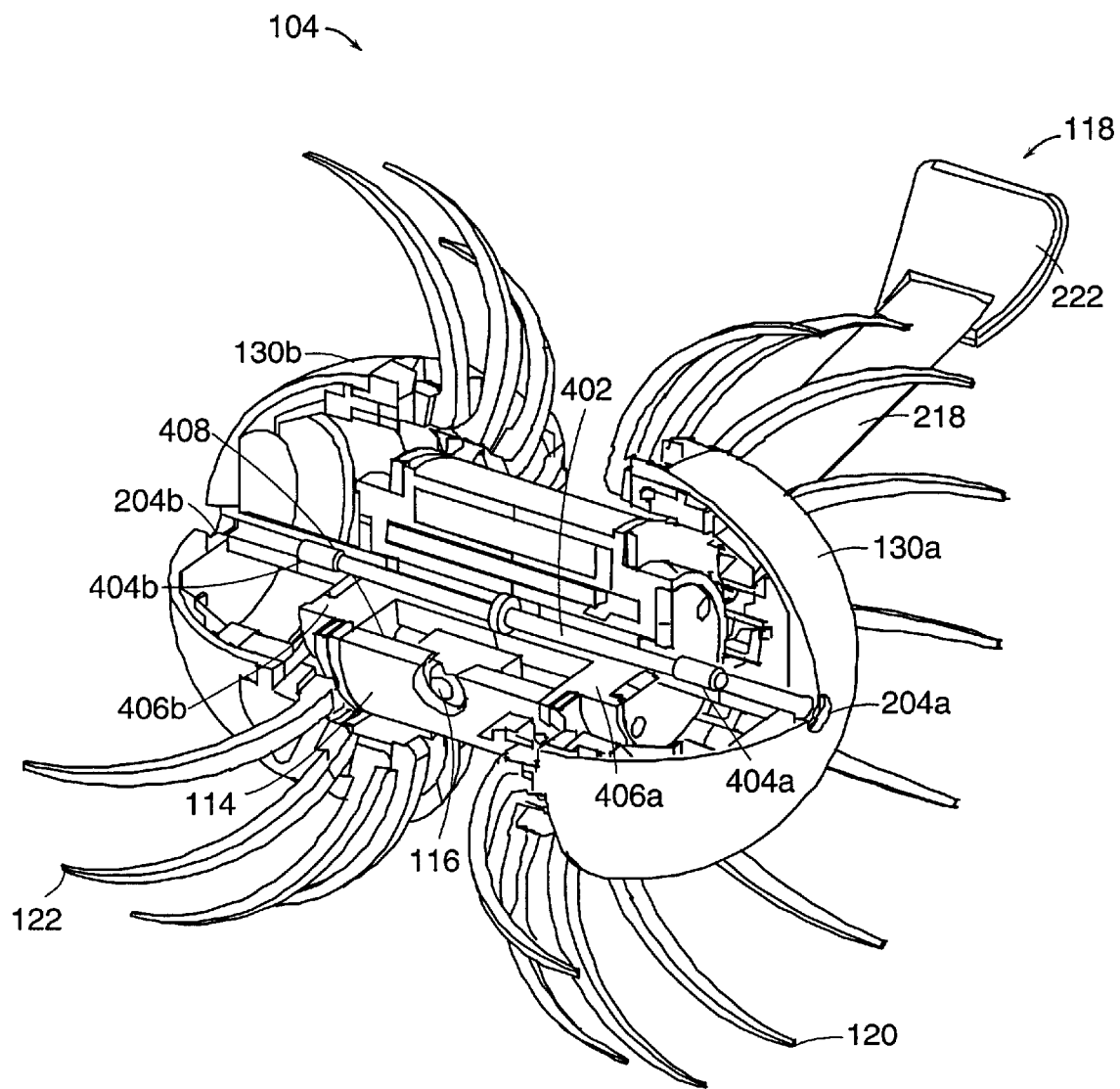
FIG. 4 is a front isometric view in a half section of the transformable vehicle of FIG. 1 in a transformed state according to an illustrative embodiment.

Referring to FIGS. 1 through 6, the transformation is preferably characterized by two steps which may, but do not necessarily, occur substantially simultaneously. Referring to FIG. 4 which illustrates a half sectional view of the transformable vehicle in transformed state, wheel assemblies 102 move away from each other along a center shaft 402 substantially coincident with the longitudinal axis passing through first and second distal ends of central chassis assembly 114. As can be seen more clearly in the illustrative embodiment of FIGS. 7 and 8, wheel assemblies are formed with a center shaft bore 704 extending therethrough for receiving center shaft bearing 702 and center shaft 402 (see FIGS. 7 and 8). Both the center shaft bearing 702 and the center shaft bore 704 are located substantially in the axial centers of wheel assemblies 110. The transformable vehicle 100 of the illustrated embodiment comprises wheel assemblies 110 rotatably attached to the first and second distal ends of the central chassis assembly 114. Preferably, the first and second wheel assemblies 110 further comprise, respectively, a first outer shell 130a, and a second outer shell 130b (collectively designated 130). In one embodiment of a stowed state 102, the outer shells 130 create a substantially spherical form-factor. In one embodiment where the wheel assemblies 110 include spines 120, 122, the spines rotate radially outward to an extended position from a position initially flush with outer shells 130 upon transformation from the stowed state to the transformed state.

Figure 27:
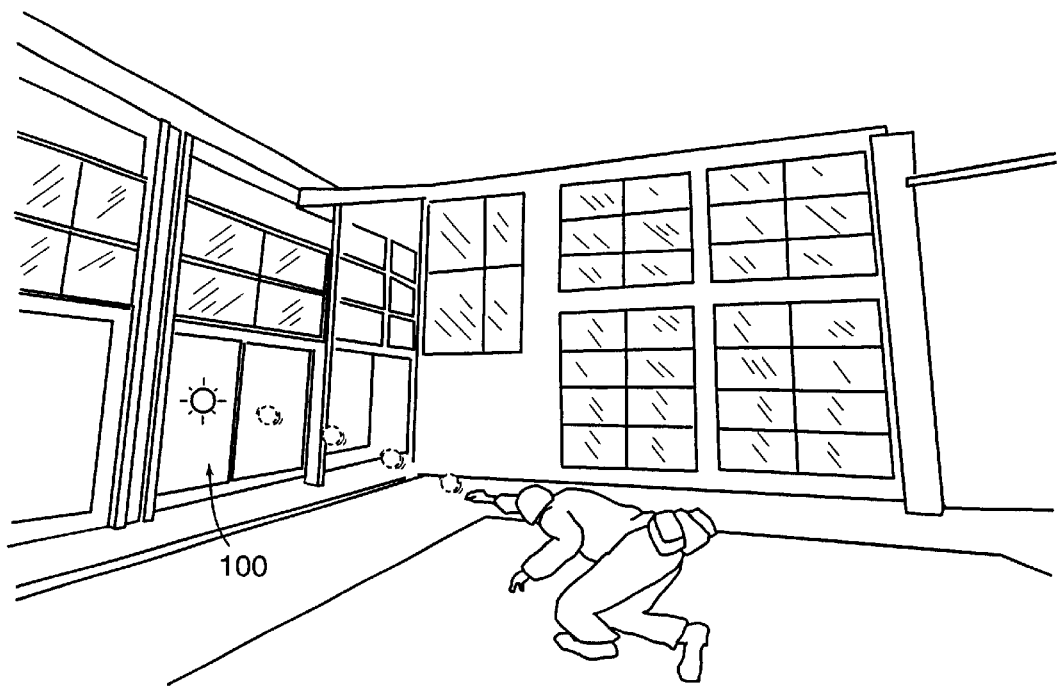
FIG. 27 depicts an exemplary method of deploying the transformable vehicle of FIG. 1.

In various embodiments, the architecture of the transformable vehicle in the stowed state 102 enables a user to deploy the vehicle by throwing it as depicted in FIG. 27. Examples of such architectures include, for example, vehicles which are substantially spherical or oblate spherical in the stowed state.

Referring now to FIG. 3, in the stowed state, wheel assemblies 110 are retained substantially adjacent to one another. In one embodiment, where the wheel assemblies further include spines 120, 122, the first plurality of spines 120 are retained substantially flush to the outer surface of outer shells 130 by a first hub cap 304a pressure-fit concentrically between a first hub cap bore 204a of the first outer shell 130a and a first wheelnut 302a. Similarly, the second plurality of spines 122 are retained substantially flush to the second outer shell 130b by a second hub cap 304b pressure-fit concentrically between a second hub cap bore 204b and a second wheelnut 302b. The spines 120, 122 may deploy via being collectively or individually biased with a spring element and/or collectively or individually actuated by a motor control assembly. In another embodiment, where the wheel assemblies further comprise spines 120, 122 or other projections, the spines are retained substantially below the surface of the wheel assemblies 110 or outer shells 130. With these arrangements, spines 120, 122 are retained substantially flush to or below the outer surface of outer shell assemblies 130 and the transformable vehicle 100 remains smaller, more durable to enable deployment, and is less observable than in the transformed state of FIG. 2.

Figure 28:
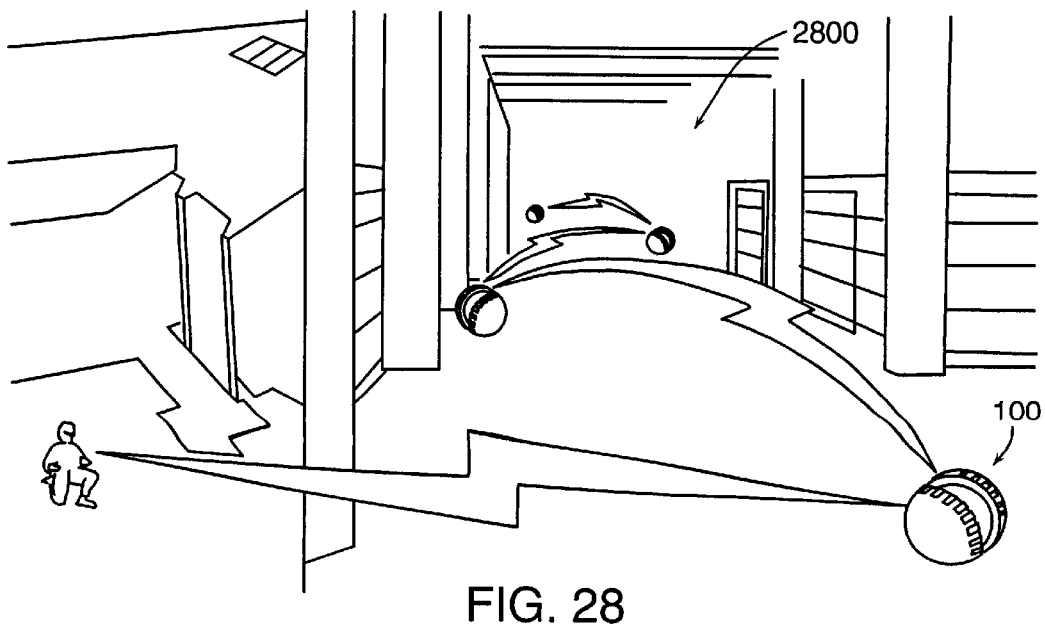
FIG. 28 depicts use of a plurality of transformable vehicles of the type depicted in FIG. 1 to form an extendable communication relay.
Figure 29:
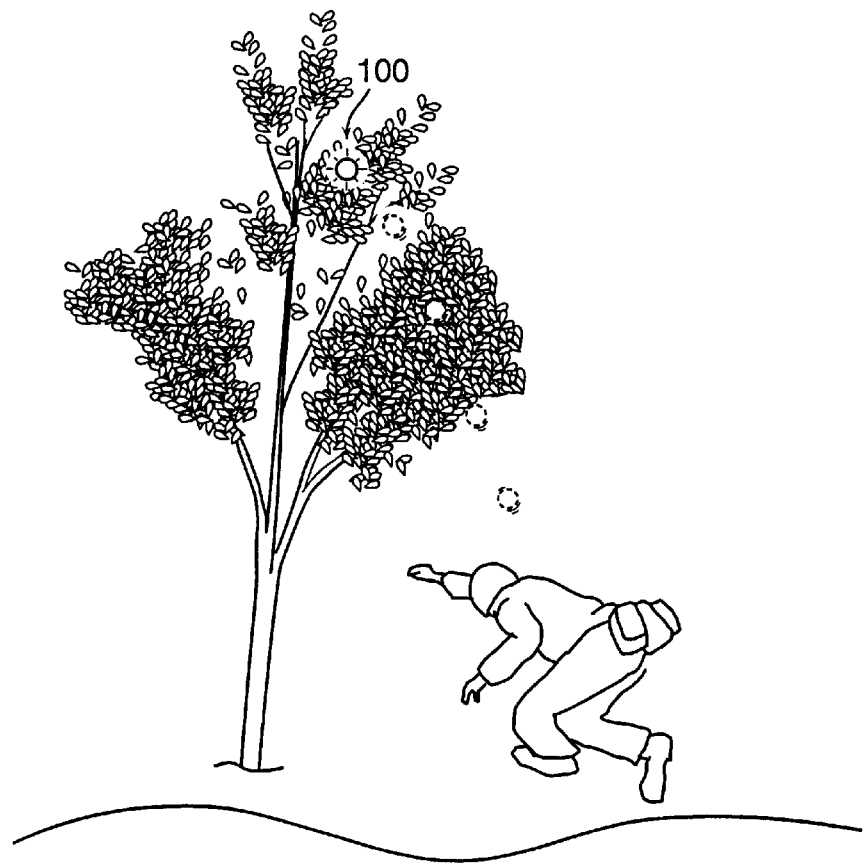
FIG. 29 depicts an exemplary method of deploying the transformable vehicle of FIG. 1 for use in under canopy surveillance.
Figure 30:
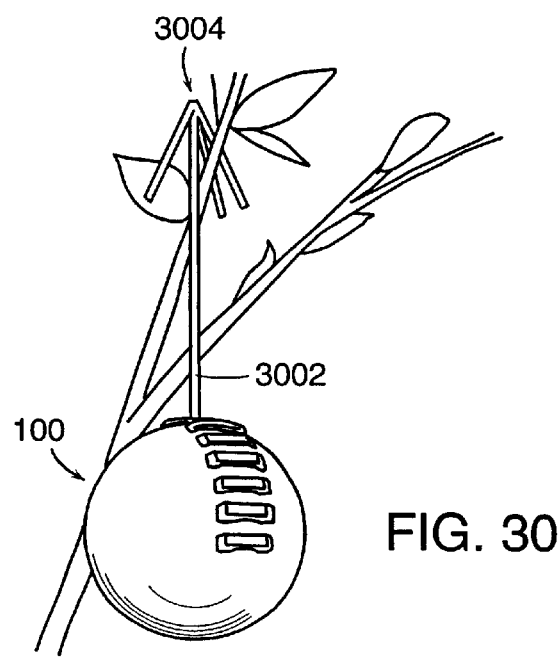
FIGS. 30–32 depict the transformable vehicle of FIG. 1 being used for under canopy surveillance.

In one embodiment of the invention, multiple transformable vehicles are deployed, for example, into a building interior or other targeted space to form an extendable communications relay 2800 as depicted in FIG. 28. FIG. 29 depicts an exemplary method of deploying the transformable vehicle by throwing for use in under canopy surveillance. In such embodiments, the transformable vehicle is preferably substantially spherical or oblate spherical in the stowed state. In other embodiments, the architecture of the transformable vehicle enables a user to deploy the vehicle by launching it with a suitable launcher. In such embodiments, the transformable vehicle is preferably substantially spherical or cylindrical in the stowed state. Suitable launchers include, but are not limited to, sling shots, tear gas canister launchers, 40 mm grenade launchers, mortars and artillery pieces.

In another embodiment, the transformable vehicle further comprises a drag chute, flap, fin or equivalent aerodynamic stabilization structure. This aerodynamic stabilization structure serves to orient the transformable vehicle in flight, such as during a throw, glide or free fall, such that it lands in the a desired orientation. The aerodynamic stabilization structure may be permanent or detachable. For example, the aerodynamic stabilization structure may comprise a chute which detaches after the vehicle has landed or sufficiently prior to landing so as not to entangle the vehicle. The ability to land in a desired orientation permits shock absorbing material to be concentrated in a small area of the transformable vehicle, rather than all over it, to cushion the transformable vehicle from falls and/or landings. By concentrating shock absorbing materials in a small area, a lighter and smaller overall transformable vehicle with extremely high shock tolerance is provided. Consequently, a transformable vehicle having an aerodynamic stabilization structure may permit longer, higher, and/or accurate throws without risk of damage upon landing. In addition, an aerodynamic stabilization structure can permit the transformable vehicle to be deployed from an aircraft.

While in the transformed state 106 illustrated in FIG. 1, and depicted in more detail in FIG. 2, the transformable vehicle 100 is adapted to locomotion, utilization of mission elements, and to completion of mission objectives. One or both of the wheel assemblies 110 may rotate to enable directional locomotion. Alternately, in another embodiment where the wheel assemblies 110, further comprise spines, the spines 120, 122 are adapted to extend and retract in succession to enable the vehicle to rotate and obviate the need for rotation of the wheel assemblies 110 to enable locomotion.

In another embodiment, in the transformed state the transformable vehicle is capable of locomotion by turning the wheels and dragging the end of the tail on the ground (into which the torque of the wheels is reacted). To turn, in one embodiment, the vehicle drives the wheels differentially. Further, the wheels of the transformable vehicle may be driven such that the chassis rotates about the wheel axis and thereby, for example, enable a fixed sensor on the chassis or in the payload bay to look up and/or down.

In another embodiment, the transformable vehicle is capable of returning to the stowed state remotely either at the command of the user or as determined by the transformable vehicle itself. For example, the transformable vehicle may determine to return to the stowed stated by on-board logic, an on-board timer, and/or in response to an environmental or internal condition (such as if the transformable vehicle comes under fire or suffers an internal malfunction).

Figure 6:
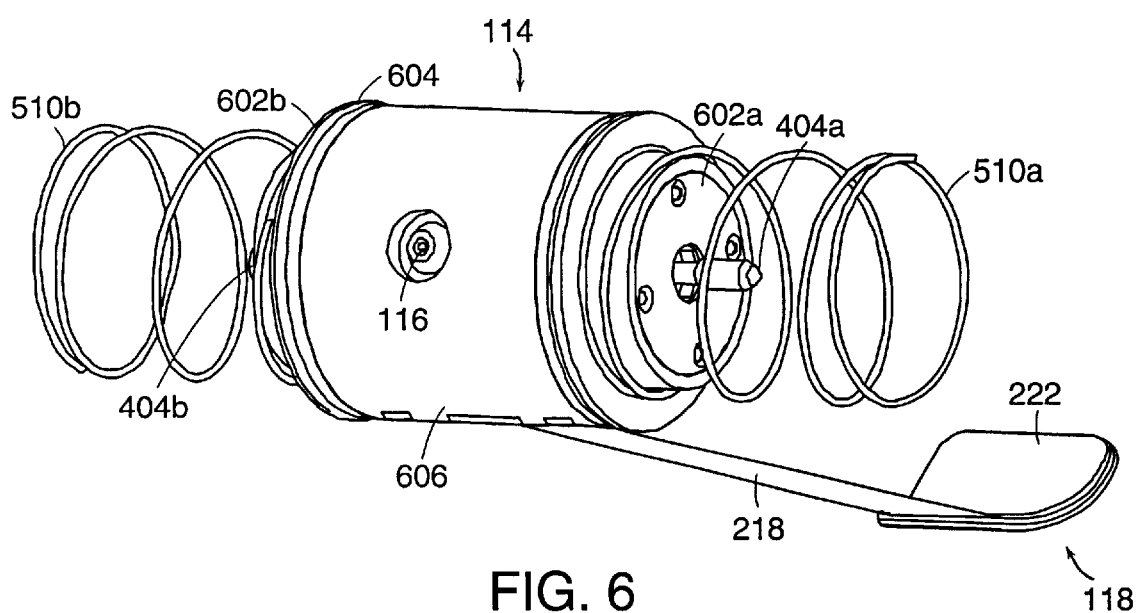
FIG. 6 is a front isometric view of an exemplary central chassis assembly of the type depicted in the transformable vehicle of FIG. 1.

In one embodiment, the transformable vehicle further comprises a tail assembly 118 as shown in FIG. 6. In one embodiment, the tail assembly 118 comprises a tail 218, tail retainer 220, and tail weight 222. The tail 218 is attached to the central chassis assembly with a tail retainer 220. After the wheel assemblies 130 have moved outward to the transformed position 106, the tail 218 deploys by uncoiling or other means and extending away from the central chassis assembly 114. In one embodiment the tail assembly 118 provides a reacting propulsion torque to the torque generated by the wheel assemblies 110. In other embodiments, the tail may also function as a grappling hook. In these embodiments, the transformable vehicle may be suspended from the canopy, elevated structures, or surfaces, and raised or lowered via a motorized winch in the payload bay as described above.

Figure 26:
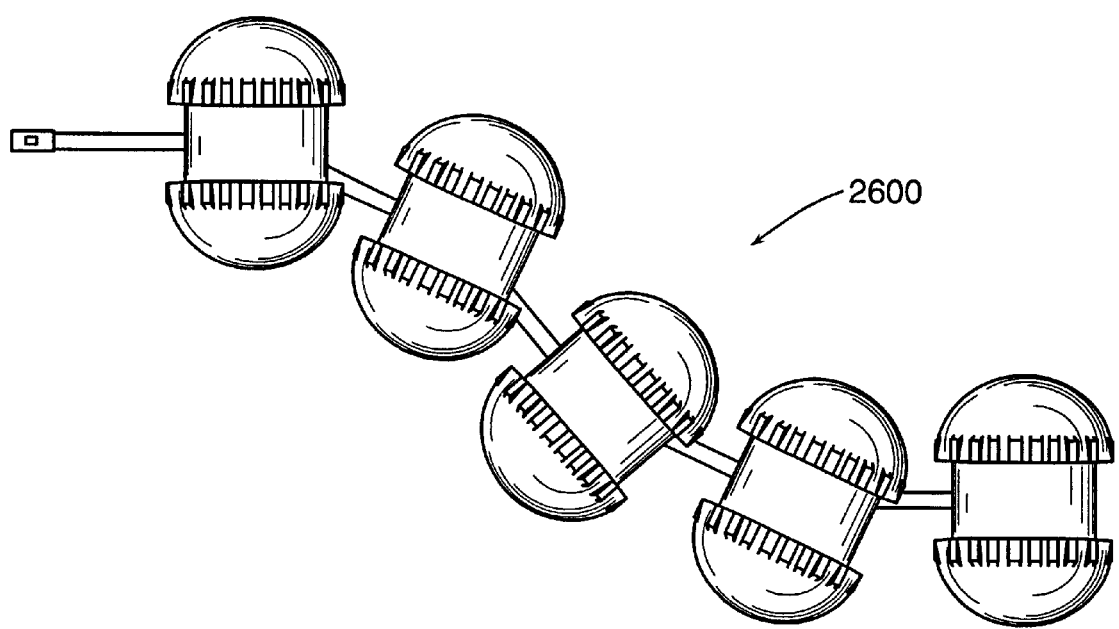
FIG. 26 depicts the transformable vehicle of FIG. 1 in an assembled state for traversing large obstacles.

In another embodiment, the transformable vehicle comprises an active tail. An active tail vehicle architecture of the transformable vehicle can provide greater obstacle climbing capability, in particular, when two or more transformable vehicles are assembled into an assembled state 2600 (FIG. 26). The active tail serves to lift the forward (active tail-equipped) transformable vehicle of the assembled transformable vehicles relative to the trailing transformable vehicle. In this manner, the assembled transformable vehicles may surmount greater vertical obstacles. For example, such an active tail can provide a transformable vehicles in the assembled state with greater stair climbing ability relative to assembled state transformable vehicles without an active tail.

In one embodiment, wheel assemblies 110 further comprise a first and second plurality of spines 120, 122. The spines can be of any suitable shape and comprised of any suitable material. Suitable shapes include, but are not limited to, linear, curved or tapered. The spines may be rigid, semi-rigid, of adjustable rigidity, of variable rigidity, and/or flexible. It is to be understood by those of ordinary skill in the art that spine rigidity may be used to select the area of the weight bearing surface. The rigidity of the spines is selected based on, for example, such factors as cost, shock tolerance, the terrain to be covered and/or the intended use(es) of the transformable vehicle. For example, in an embodiment wherein the intended use of the transformable vehicle is as a children's toy, the spines are blunt and comprised of a soft, flexible non-toxic material. In one embodiment, the spines are comprised of a semi-rigid material and a piezoelectric material that enables the transformable vehicle, or an operator, to vary the rigidity of the spines upon application of a voltage to the material. Further, different spines may be different shapes and of different materials to, for example, provide traction in a variety of terrain conditions. In other embodiments, the spines may be paddle shaped to provide mobility while the vehicle is surfacing or submerged in water and/or to provide enhanced mobility over surfaces such as for example, gravel, sand, snow, and/or mud. In one embodiment, spines 120, 122 are substantially identical. In other embodiments, the spines of the first plurality of spines 120 may be dissimilar from the second plurality of spines 122 in length, radii, or composition. Further, the individual spines of the first plurality 120 or second plurality 122 may be non-uniform as to these characteristics.

Figure 7:
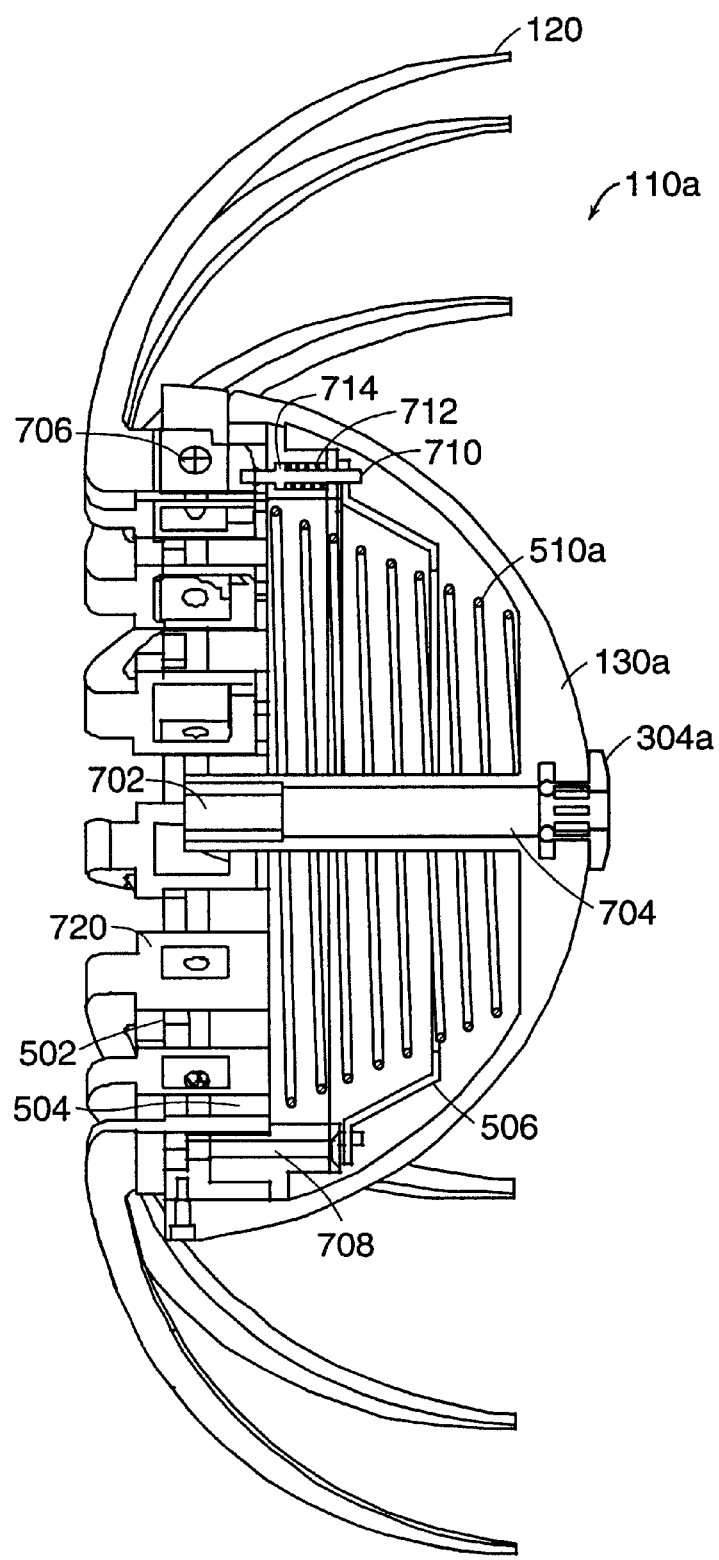
FIG. 7 is a sectional view of an exemplary wheel assembly of the type employed in the transformable vehicle of FIG. 1 shown in a transformed state.
Figure 8:
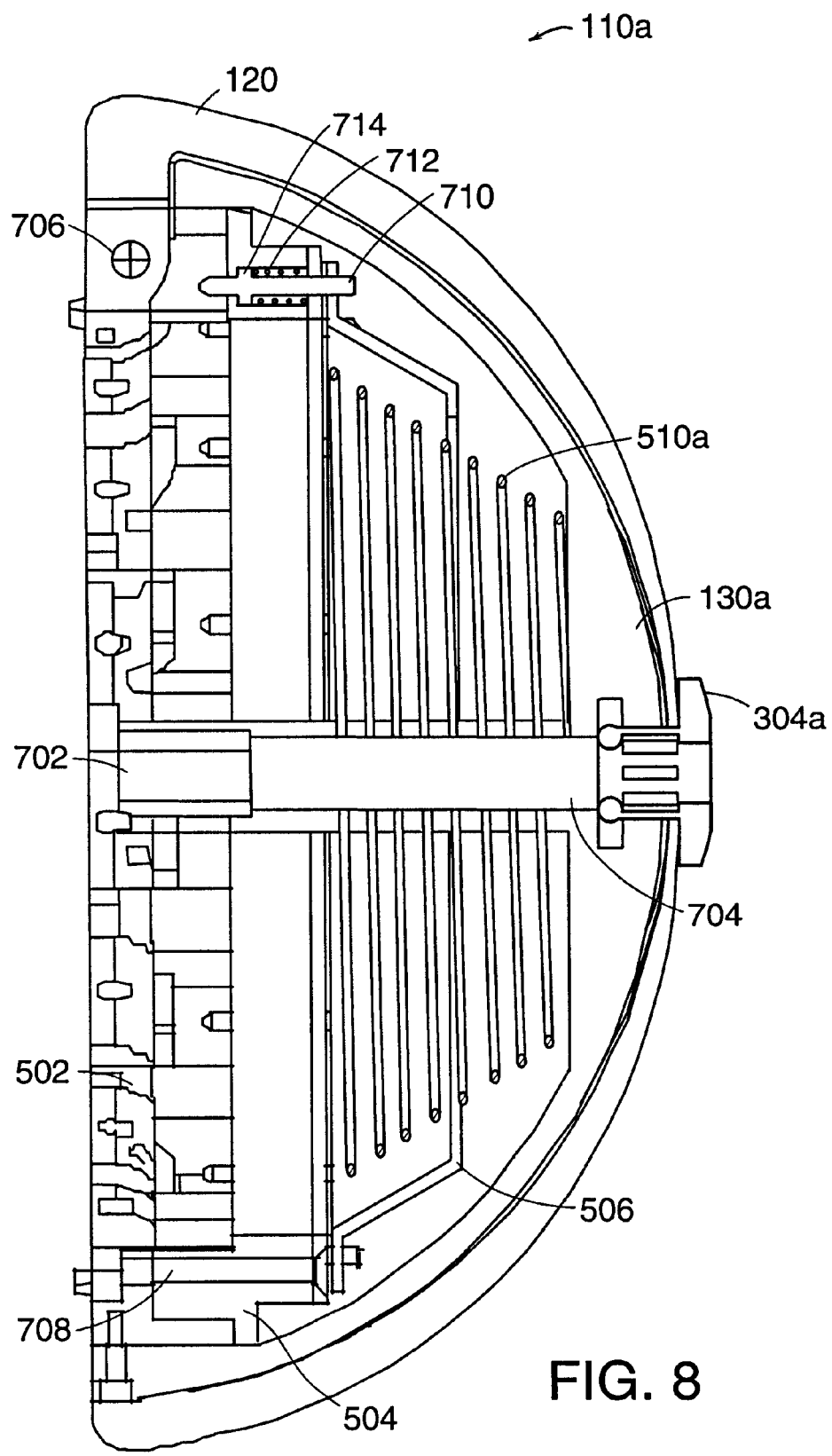
FIG. 8 is a sectional view of an exemplary wheel assembly of the type employed in the transformable vehicle of FIG. 1 shown in a stowed state.

As shown in FIGS. 1–3, and in shown in section in FIGS. 7–8, in one embodiment, the first plurality of spines 120 are movably mounted within a first plurality of outer shell notches 206a located along the circumferential edge of the first outer shell 130a. Similarly, the second plurality of spines 122 are movably mounted to the second plurality of outer shell notches 206b located along the circumferential edge of the second outer shell 130b. As illustrated more clearly in FIG. 8, both the first and second plurality of spines, 120, 122 are curved with radii that are substantially congruent to the radii of both substantially hemispherical outer shells 130 to enable the spines 120, 122 to generally conform to the outer surface of substantially hemispherical outer shells 130 when the vehicle is in the stowed state 102.

In one embodiment, to deploy from the stowed to transformed state, the wheel assemblies 110 move along center shaft 402 and the first spines 120, 122 move to a radially extended position via a spring bias, motor actuation, or other means. The spines 120, 122 rotate about the first distal end of each spine which is rotatably attached to the circumferential edges of the outer shells 130 at the first and second plurality of outer shell notches 206a, 206b. The movement of spines may be described in greater detail with respect to an illustrative embodiment by reference to FIGS. 1–3 and 7–13. Beginning in the stowed state, the second distal end of the first plurality of spines 120 is proximate to the first wheelnut 302a and the second distal end of each spine of the second plurality of spines 122 is proximate to the second wheelnut 302b. As the vehicle traverses to the transformed state, the spines 120, 122 radially extend away from the outer shells 130 in a path described by an arc with a center at the first distal end of the spine 140, and intersecting the second distal end of the spine 142.

Figure 5:
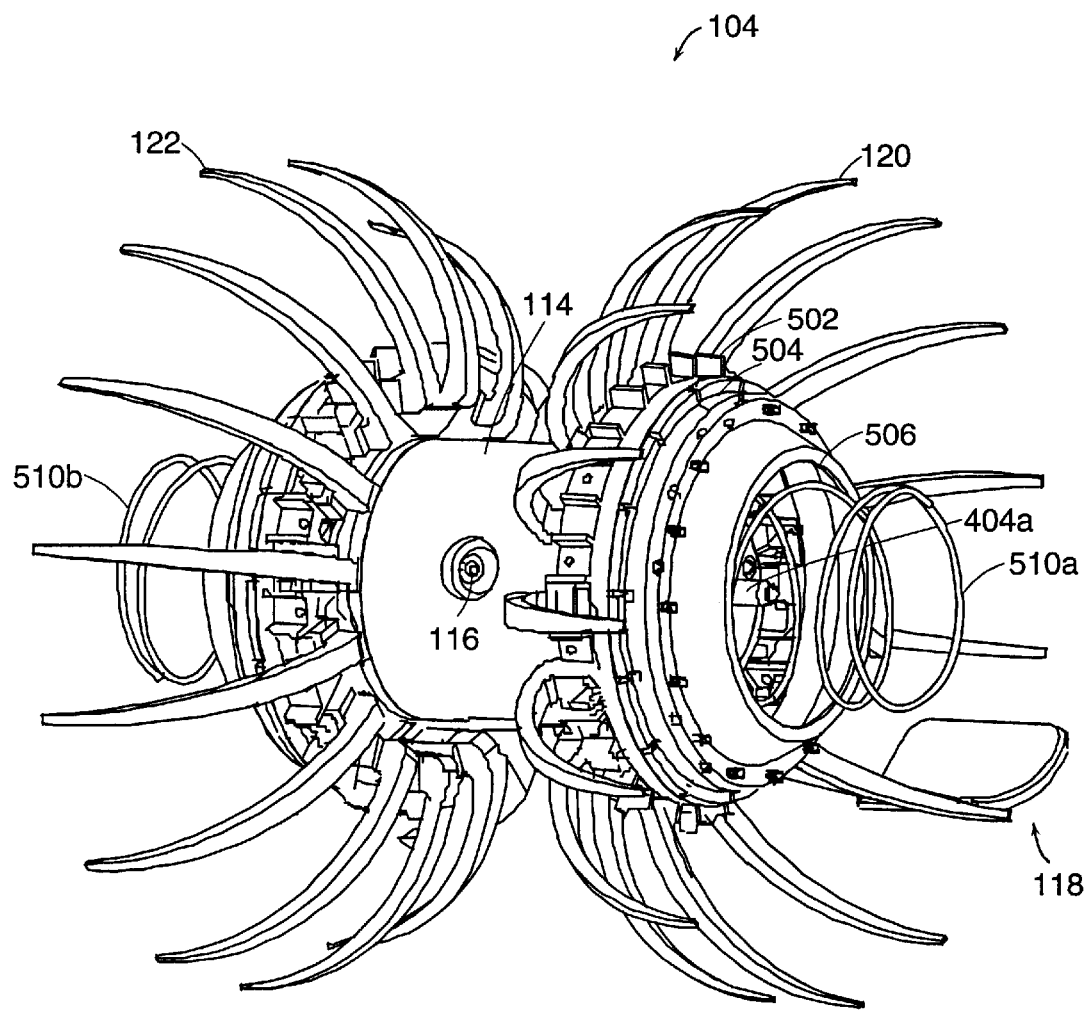
FIG. 5 is a front isometric view of the transformable vehicle of FIG. 1 in a transformed state with the first and second outer shells removed.

Referring now to FIG. 5, which depicts a front view of the transformable vehicle in a transformed state with the outer shells 130 removed, according to an illustrative embodiment. With the outer shells 130 removed from the wheel assemblies 110, the spine pivot ring 502, the keeper ring 504, the detent pin delatch actuator 506 and the first main spring 510a are visible. The spine pivot ring 502, keeper ring 504, and detent pin latch activator 506 are all annularly shaped and are joined together along the circumferential edges of each element. The spine pivot ring 502, the keeper ring 504, and the detent pin delatch activator 506 are depicted in cross-section with the vehicle in the transformed state 106 in FIG. 7 and similarly, depicted in cross section with the vehicle in the stowed state 102 in FIG. 8. Spines 120, 122 are attached to the circumferential edge of the spine pivot ring 502. The spine pivot ring 502 contains cut-out notches for receiving the first distal end 140 (FIGS. 2, 5, and 22–24 as discussed further below) of the spines 120, 122. Detent pin delatch actuator 506 is attached to the keeper ring 504 and the keeper ring 504 is attached to the spine pivot ring 502. With first outer shell 130a removed, the first main spring 510a is uncompressed and extends through the center opening of the ring-shaped detent pin delatch actuator 506.

Figure 22:
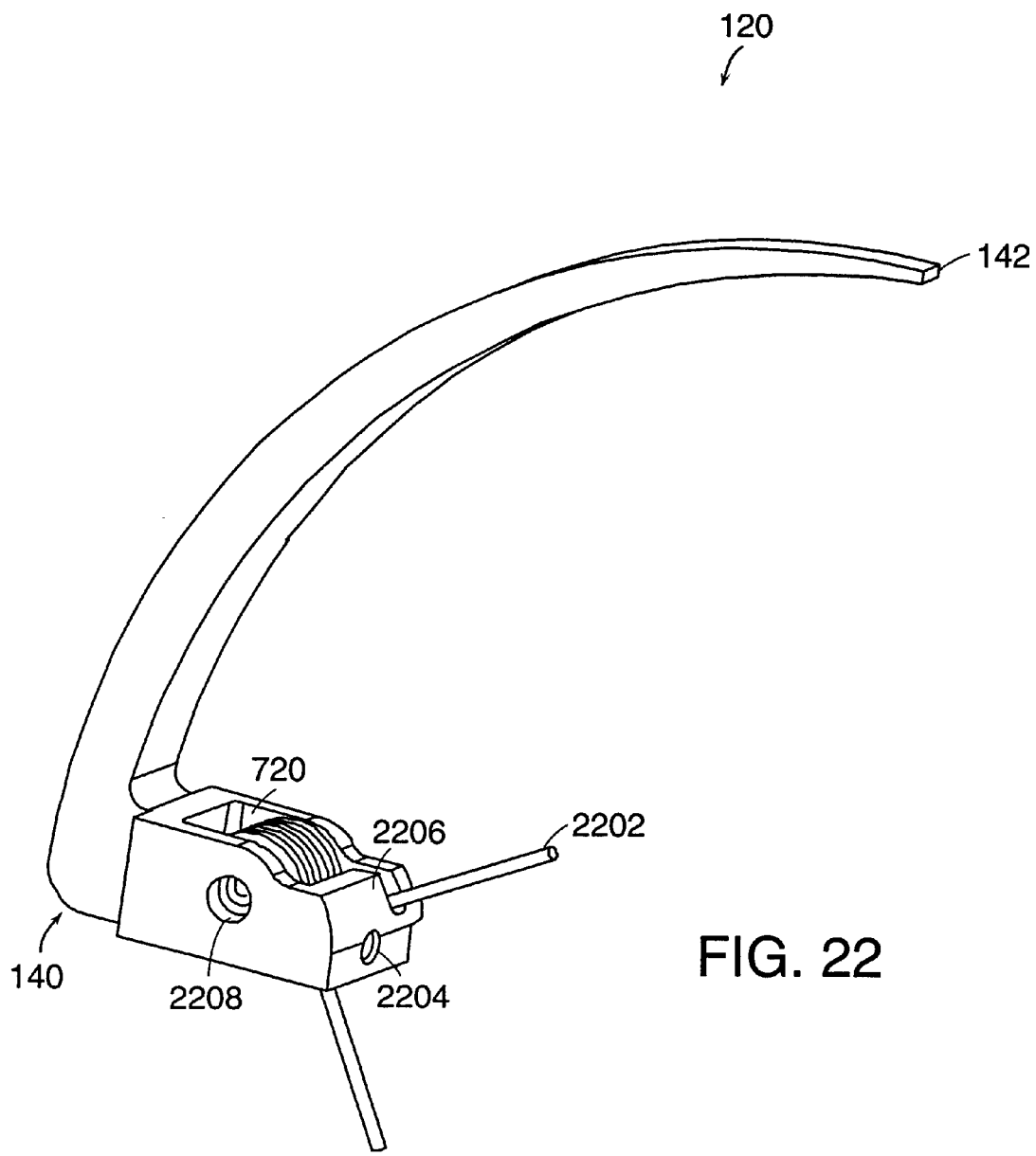
FIG. 22 is a side isometric view of an exemplary spine of the type depicted in FIG. 1.
Figure 23:
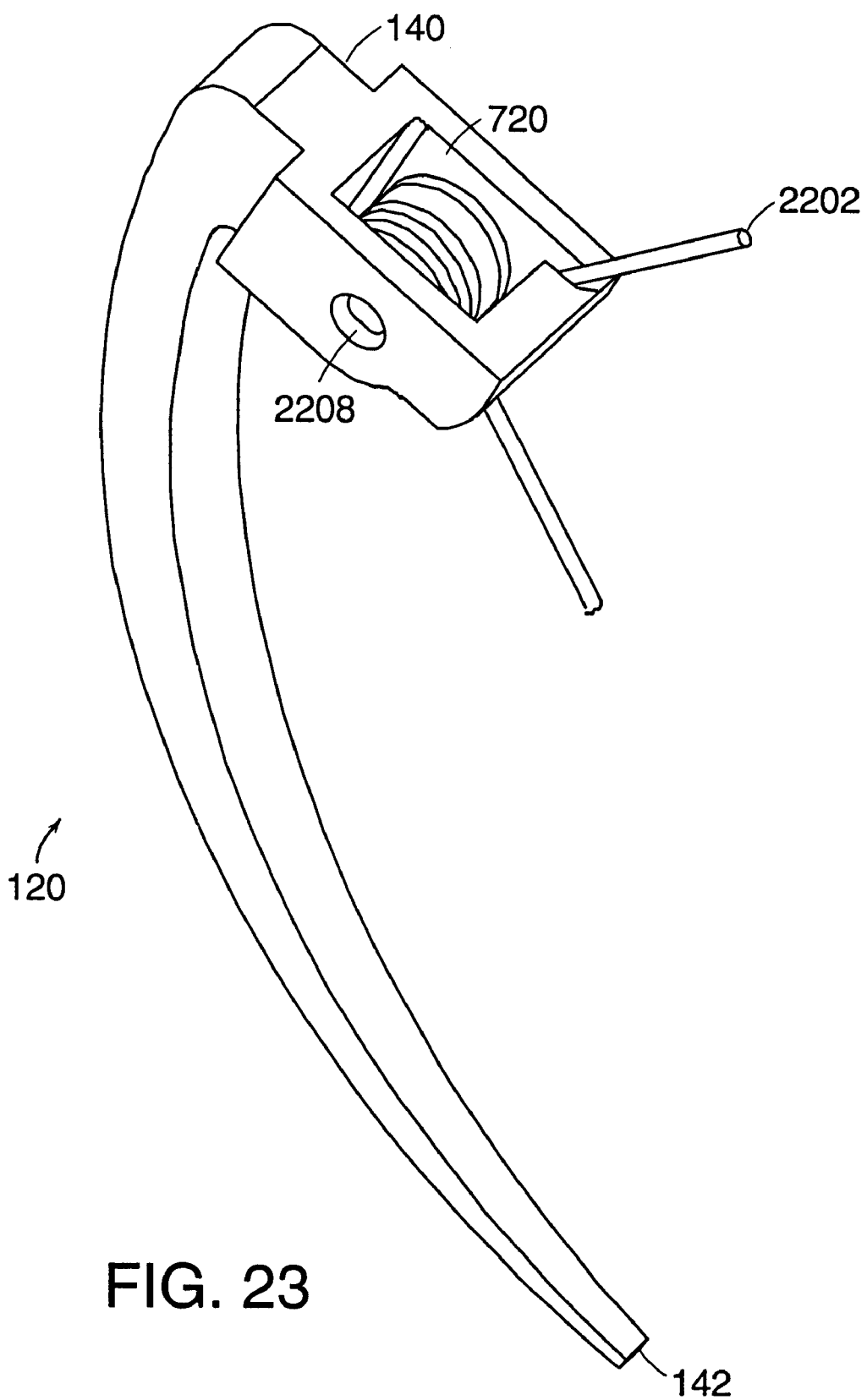
FIG. 23 is a bottom isometric view of an exemplary spine of the type depicted in FIG. 1.
Figure 24:
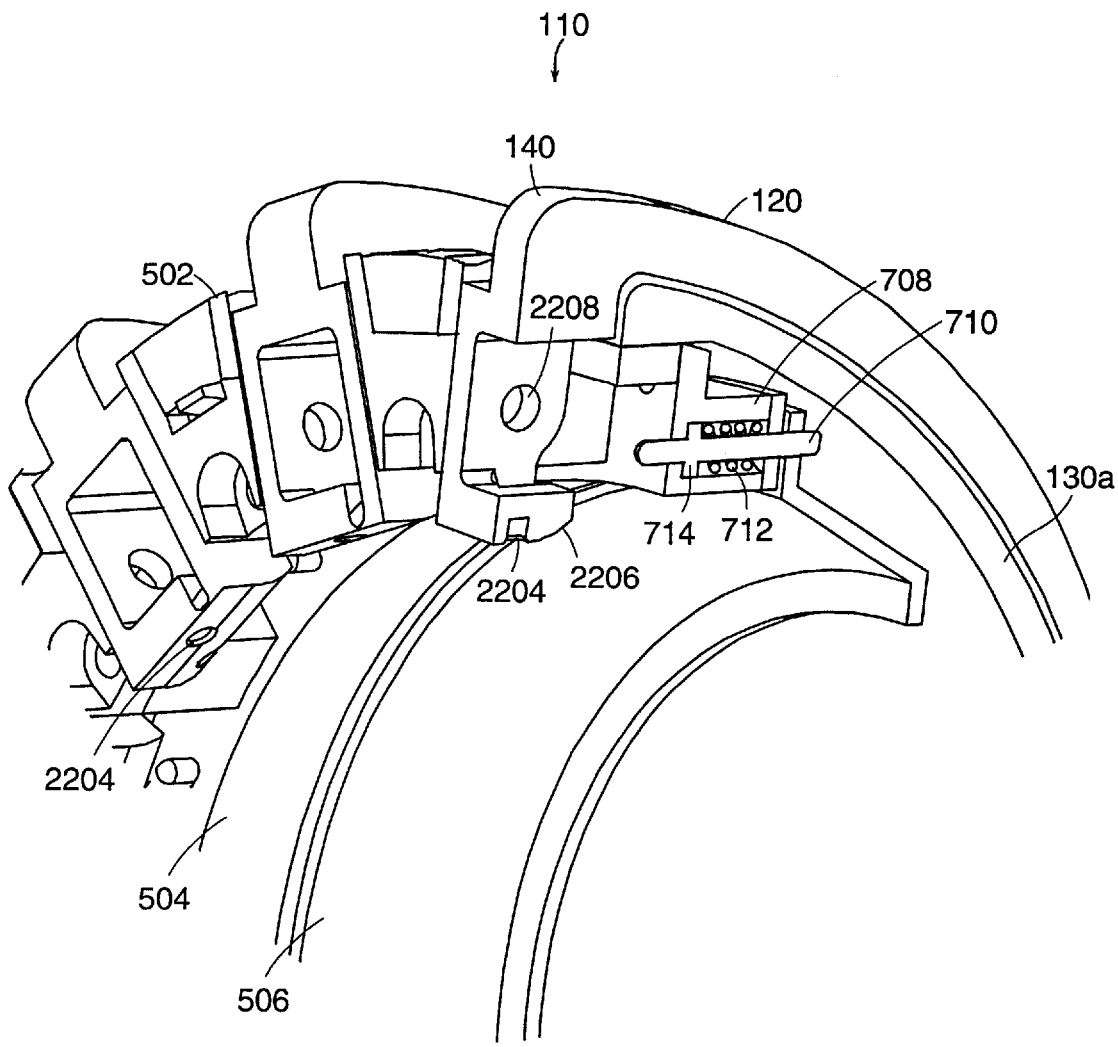
FIG. 24 is a detailed sectional view of a wheel assembly of the transformable vehicle of FIG. 1 in a stowed state.
Figure 25:
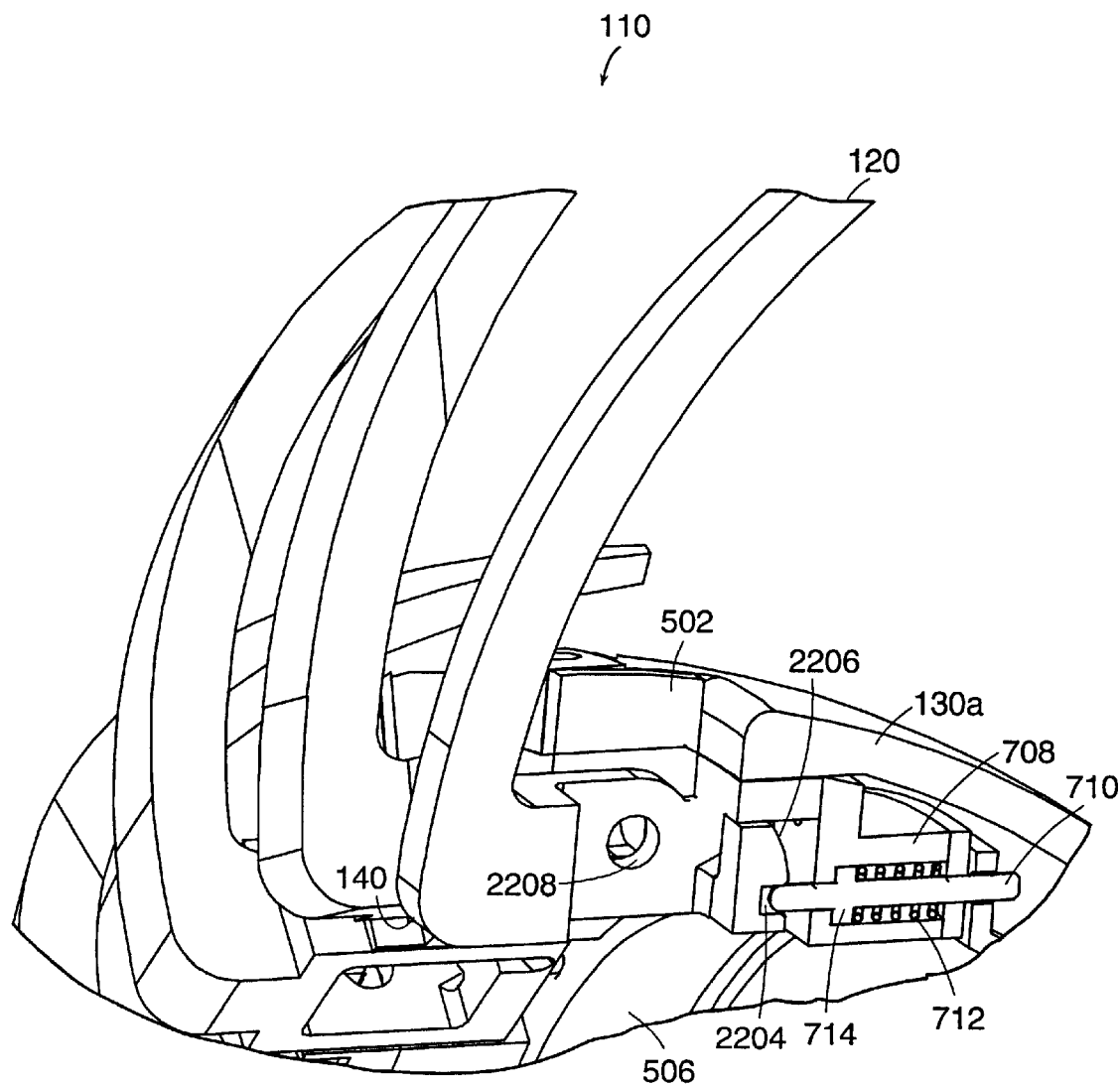
FIG. 25 is a detailed sectional view of a wheel assembly of the transformable vehicle of FIG. 1 in a transformed state.

FIGS. 22 and 23 show an illustrative embodiment of individual spine 120, 122. FIG. 22 is a front-view of an exemplary spine depicted in FIG. 1. FIG. 23 is a bottom-view of the exemplary spine of the type depicted in FIG. 1. As mentioned above, the spines 120, 122 have radii of curvature corresponding to outer shells 208 to permit a substantially flush fitting while the transformable vehicle 100 is in the stowed state 102. Spine 120, 122 rotates about the spine axle 706 located at the first distal end 142 of the spine. The spine spring enclosure 720, containing the spine spring 2202 is located at the first distal end of the spine 142. The spine spring 2202 is oriented within the spring spine enclosure 720 to align with the spine axle hole 2208 to permit insertion of a spine axle 706. The spine tapers from the first distal end 140 to the second distal end 142. The detent pin latching hole 2204 is located transversely to the spine axle hole 2208 within the spine spring enclosure 720. The detent pin latching hole 2204 receives a detent pin 710, (see FIGS. 7, 8, and 9), for securely holding spines 120, 122 in the extended position while the transformable vehicle 100 is in the transformed state 106 as depicted in section in FIG. 7.

FIGS. 7 and 8 present a cross sectional view of an exemplary wheel assembly 110 of the type employed in the transformable vehicle of FIG. 1. FIG. 7 depicts a cross section of wheel assemblies 110 in the transformed state 106 and FIG. 8 depicts a cross section of the wheel assemblies 110 in the transformed state 102. The manner of assembly of the outer shells 130, the spine pivot rings 502, the keeper ring 504, and the detent pin delatch actuator 506 is shown. As shown, the spine pivot ring 502 is notched, tabbed at locations around the circumferential edge and is complementarily shaped for fitting with the keeper rings 504. A representative detent pin 712 is shown substantially compressed between the detent pin shoulder 714 and the detent pin housing 708.

Referring again to isometric views of one embodiment of an individual spine as depicted in FIGS. 22 and 23. While the spines 120, 122 rotate toward an extended position about spine axle 706, the chamfered surface 2206 of the first distal end 140 of spine 120 engages the detent pin 710 displacing it toward outer shells 130 and compressing detent pin spring 712 between detent pin shoulder 714 and detent pin housing 708. When the spins 120, 122 are fully rotated and extended, the detent pin 710 is aligned with and extends through the detent pin latching hole 2204, locking the spines 120, 122 in place in an extended position.

To unlock the spines 120, 122 and restore the transformable vehicle to the stowed state 102, the detent pin delatch actuator 506 is manually depressed longitudinally away from the central chassis assembly 114 and thereby retracts the detent pin 710 from the detent pin latching hole 2204, permitting manual rotation of spines 120, 122 against the bias from spine spring 2202 towards a position flush with the outer shells 130 until hub caps 304 are reattached to wheelnuts 302 thereby locking spines 120, 122 at second distal ends 142. In another embodiment, restoring the vehicle to the stowed state is substantially automated.

Referring now to FIGS. 1–3, 5, and 6, in one embodiment, the central chassis assembly 114 is cylindrical in shape with first and second distal ends of center shaft 402, passing through the first and second distal ends of the central chassis assembly 114 and substantially coincident with the longitudinally axis passing through the center of outer shells 130. The wheel assemblies 110 are movably mounted to the distal ends of the central chassis assembly. Wheel assemblies 110 are adapted to move along the longitudinal axis that passes through the distal ends of the central chassis assembly 114 from the stowed state 102, to the transformed state 106. As shown in FIG. 6, a mission objective element 116 (such as a camera, optical sensor, audio speakers, microphone, etc.) is contained within the central chassis assembly 114 and, in the case of a camera, optical sensor, etc. is externally visible through an aperture in the central chassis assembly 114. Referring to FIGS. 5–8, in one embodiment, the transformable vehicle 100 transforms from a stowed state 102 to a transformed state 106 using at least one main spring 510 adapted to bias the first and second wheel assemblies 110 along the center shaft 402 which transects the chassis assembly 114. In one such embodiment, a first main spring 51 0a is disposed between first distal end of central chassis assembly 114 and the first outer shell 130a to bias the first wheel assembly outward along the central shaft 402. Similarly, disposed between second distal end of central chassis assembly 114 and second outer shell 130b is a second main spring 510b to bias the second wheel assembly 110b outward along the central shaft 402.

Figure 13:
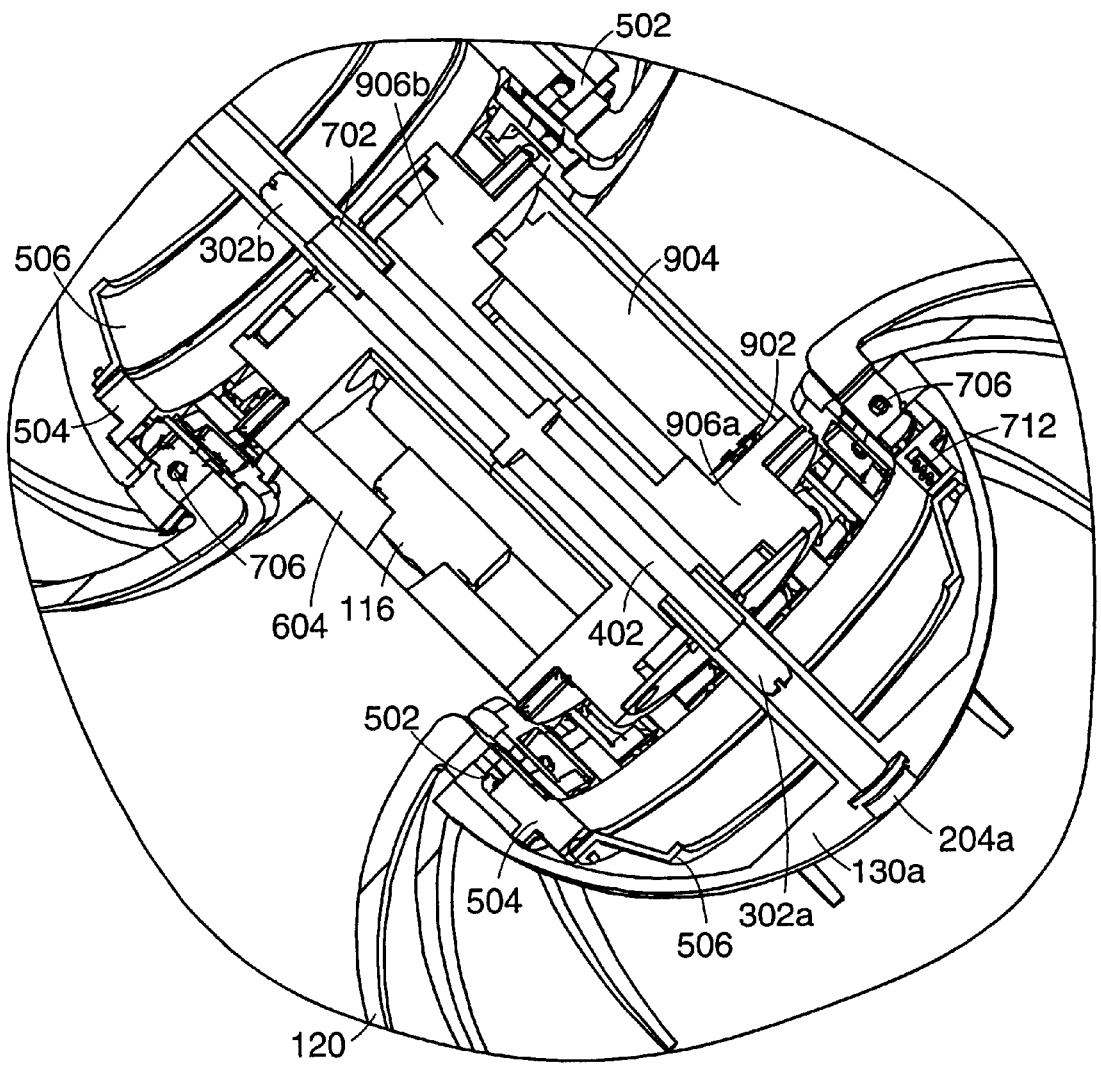
Figure 14A:
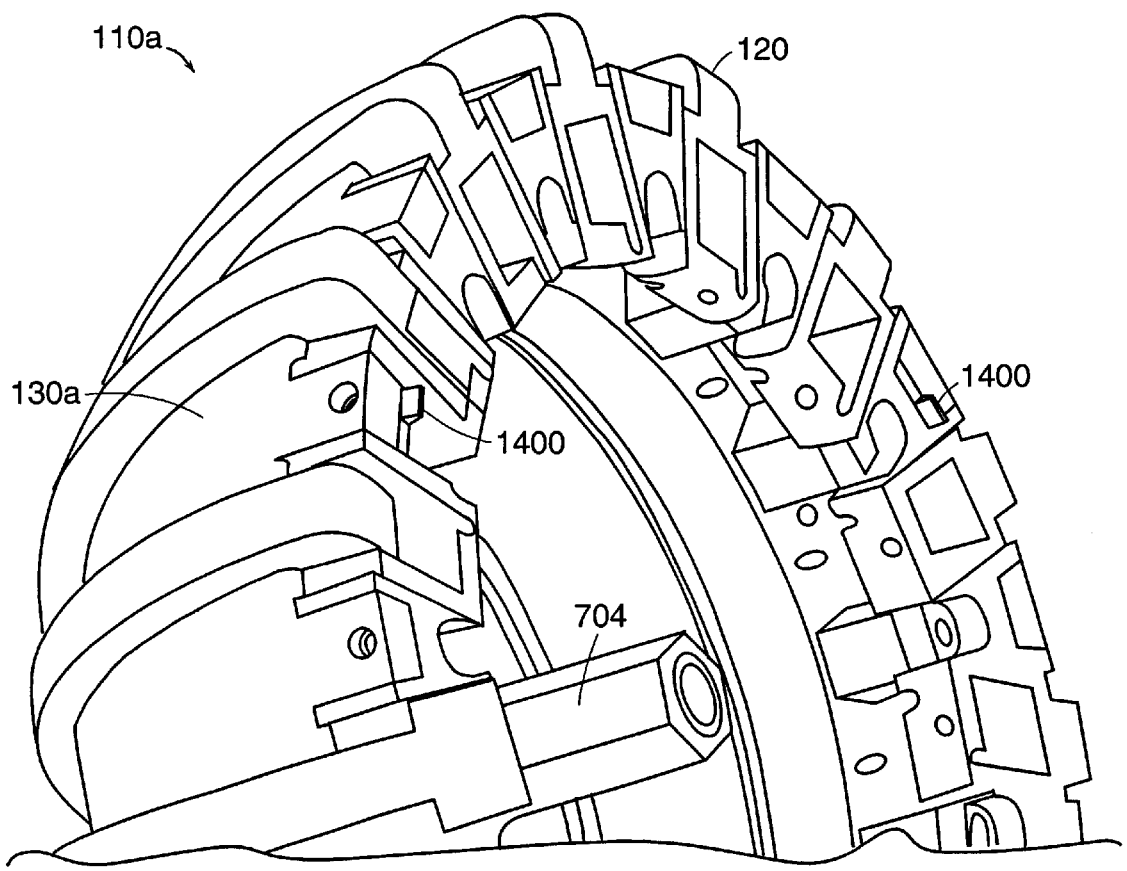
FIG. 14A is an isometric view of a wheel assembly showing exemplary locking latch slides.
Figure 14B:
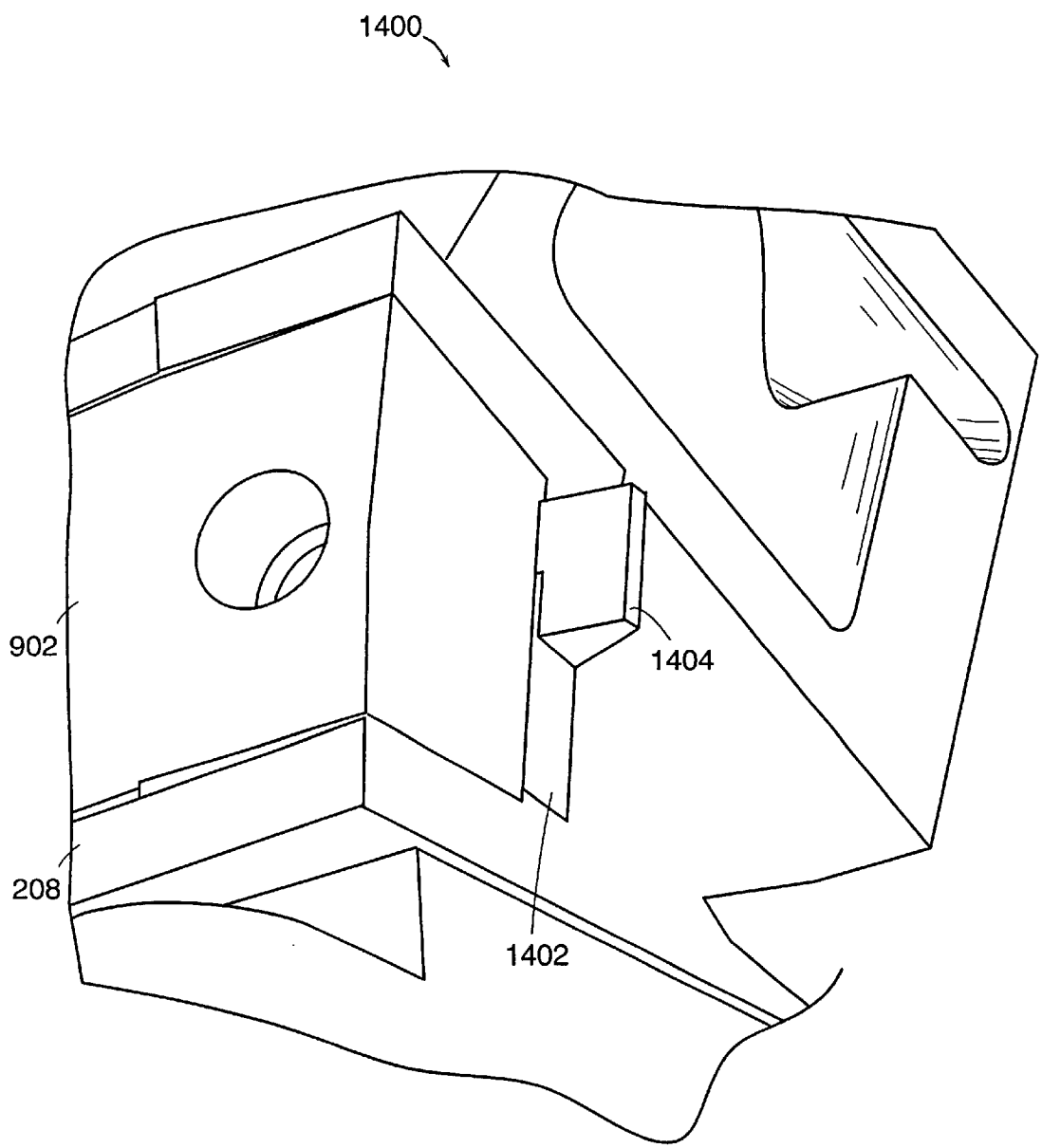
FIG. 14B is a detailed isometric view of an exemplary locking latch slide of the transformable vehicle of FIG. 1.

Referring to FIGS. 1–3 and 9–14, in one embodiment, the vehicle transforms from the stowed state 102 to the transformed state 106 as follows. Beginning in the stowed state 102 as shown in FIG. 3, the wheel assemblies 110 are manually counter-rotated to disengage and release the three locking latch slides 1400 as shown in FIG. 14. In an alternative embodiment, the wheel assemblies 110 are driven in opposite directions by a first drive motor 406a and a second drive motor 406b. Referring to FIGS. 14A and 14B, at least one latch slide 1400 is located along the circumferential edge 306 of both wheel assemblies 110 and comprise a latching hook recess 1402 which is adapted to receive a corresponding latching hook 1404 as the wheel assemblies 110 engage. As the wheel assemblies 110 are rotated in opposite directions about the center shaft 402 the latching hook 1404 of first wheel assembly 110a engages and locks an opposing latching hook of second wheel assembly 110b. The first hub cap 304a is displaced from the first wheelnut 302a and substantially simultaneously, the second hub cap 304b is displaced from the second wheelnut 302b. The release of the hub caps 304 may be by remote manual means, in response to an ambient environmental stimulus such as ground impact shock, radio frequency signal, or by other automated means. After the retaining hub caps 304 are ejected, the wheel assemblies 110 move outward and away from chassis assembly 114 along the center shaft 402 by a first main spring 510a and a second main spring 510b displaced between outer shells 130 and chassis assembly 114. In one embodiment, as shown in FIG. 3, the first wheel assembly 110a overlays a first portion of the central chassis assembly 114 and the second wheel assembly 110b overlays a second portion of the central chassis assembly 114 while the vehicle is in the stowed state. Accordingly, in this illustrative embodiment, the movement of the first and second wheel assemblies along the center shaft 402 and away from the central chassis 114 reveals the central chassis assembly and exposes the mission objective element 116 and permits deployment of a tail 218 and tail weight 222 attached to the central chassis assembly 114 by a tail retainer 220.

Figure 9:
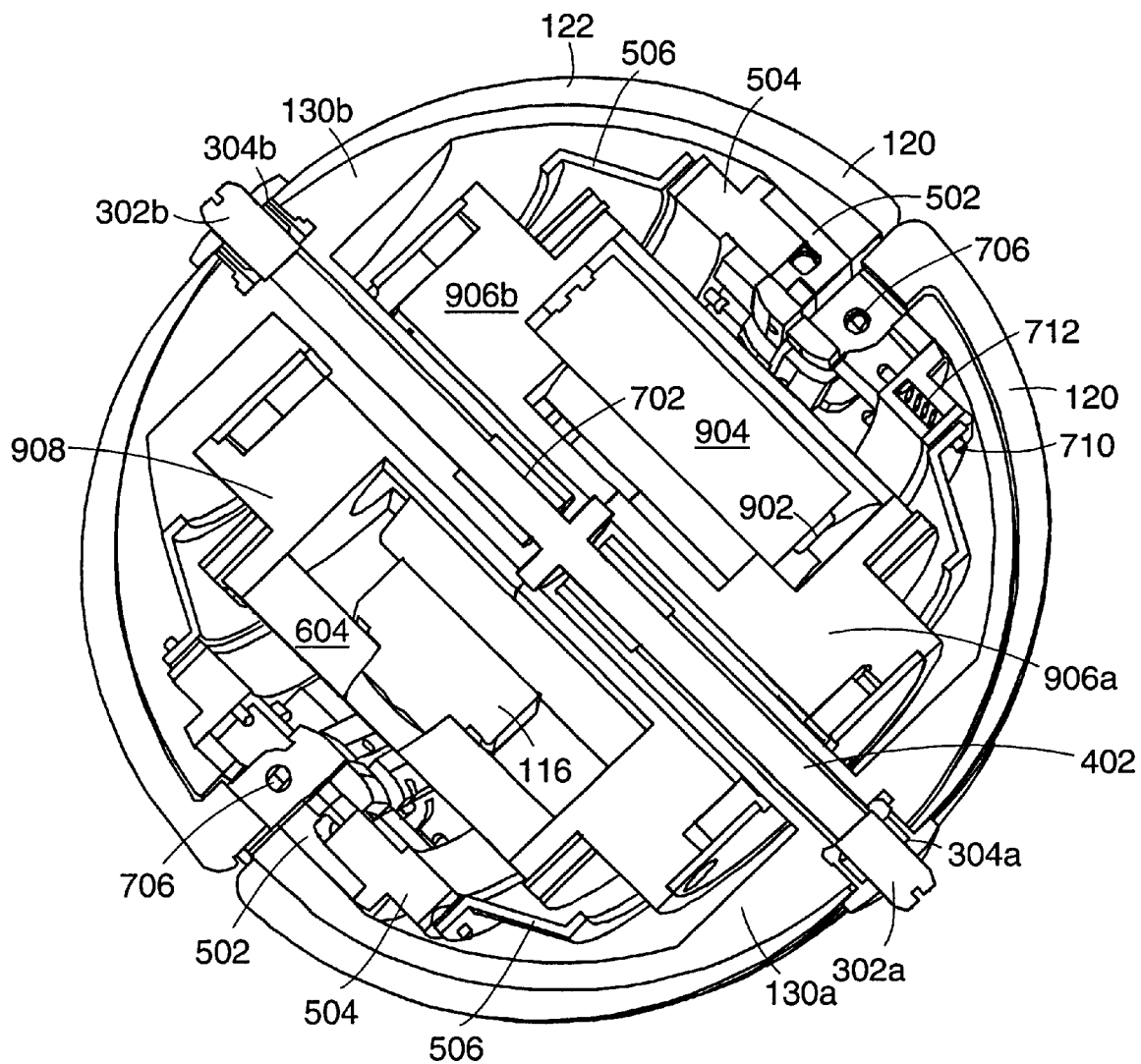
FIGS. 9–13 depict top sectional views of the transformable vehicle of FIG. 1 in a progression of states from stowed to fully transformed.
Figure 10:
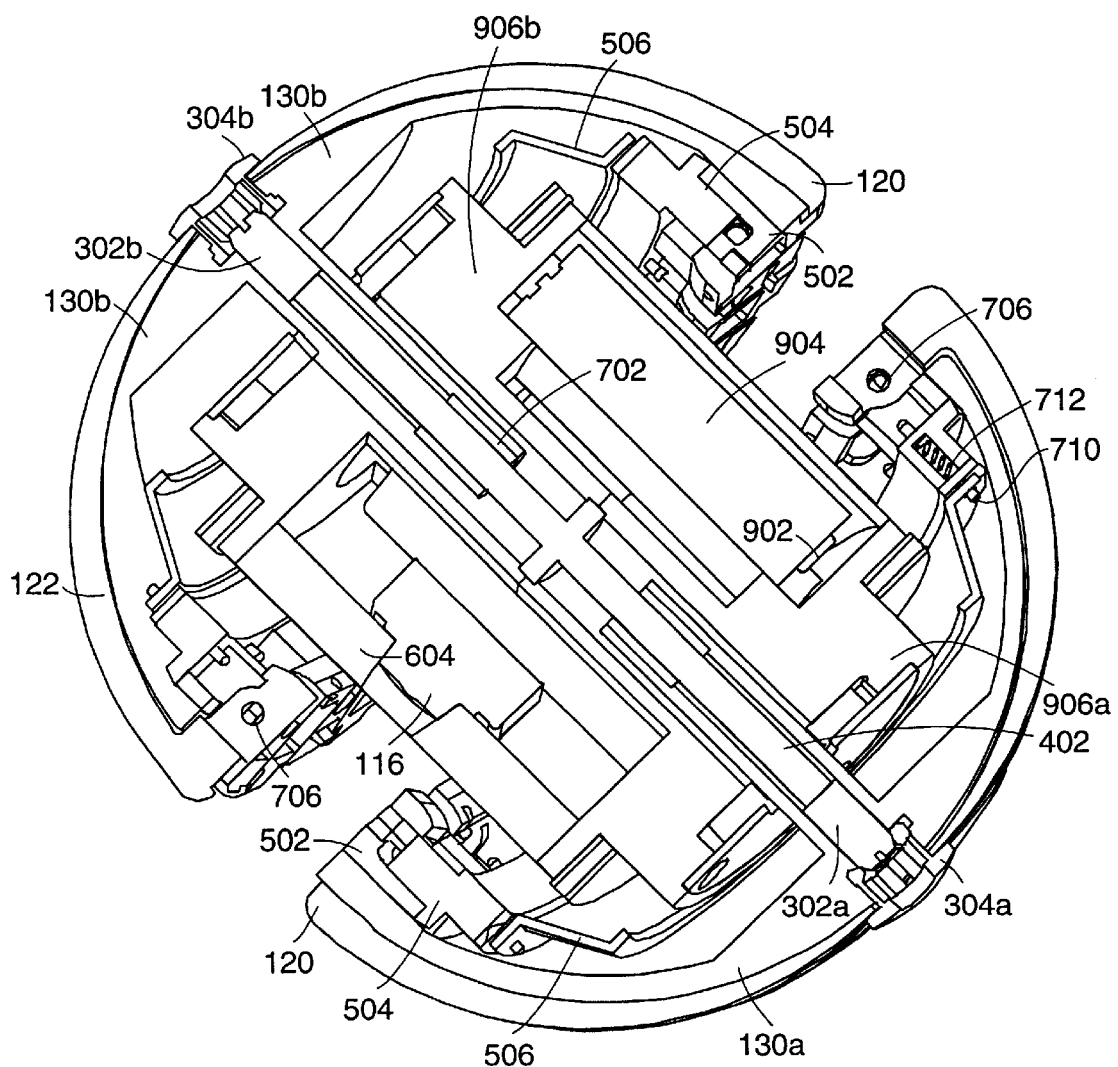

FIGS. 9–13 depict sectional views of one embodiment of the transformable vehicle in progressive configurational states from the stowed state 102 in FIG. 9 to the filly transformed state 106 in FIG. 13. FIGS. 9–13 also depict the central chassis assembly 114 in expanded detail. The first area of the chassis assembly 906a, the second area of the chassis assembly 906b, the battery 902, the battery cover 904, and the central assembly electronics cover 908 are shown. The center shaft 402 transects the entire vehicle through the center shaft bore 702 of the central chassis assembly 114 and is secured by the center shaft bearing 702 at the mid-section of the center shaft 402 and fitted with first wheelnut 302a at a first distal end and fitted with second wheelnut 302b.

Figure 11:
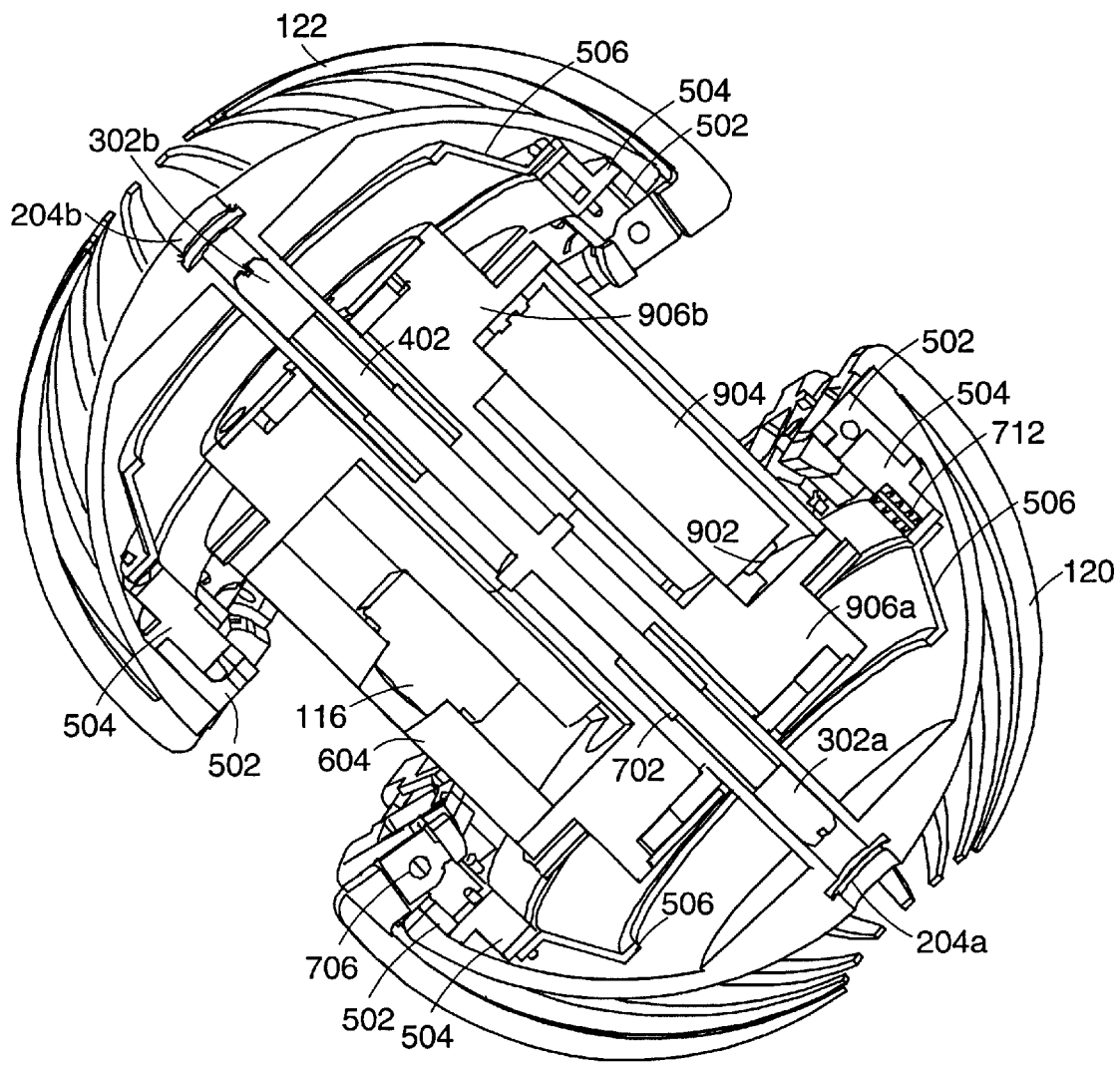
Figure 12:
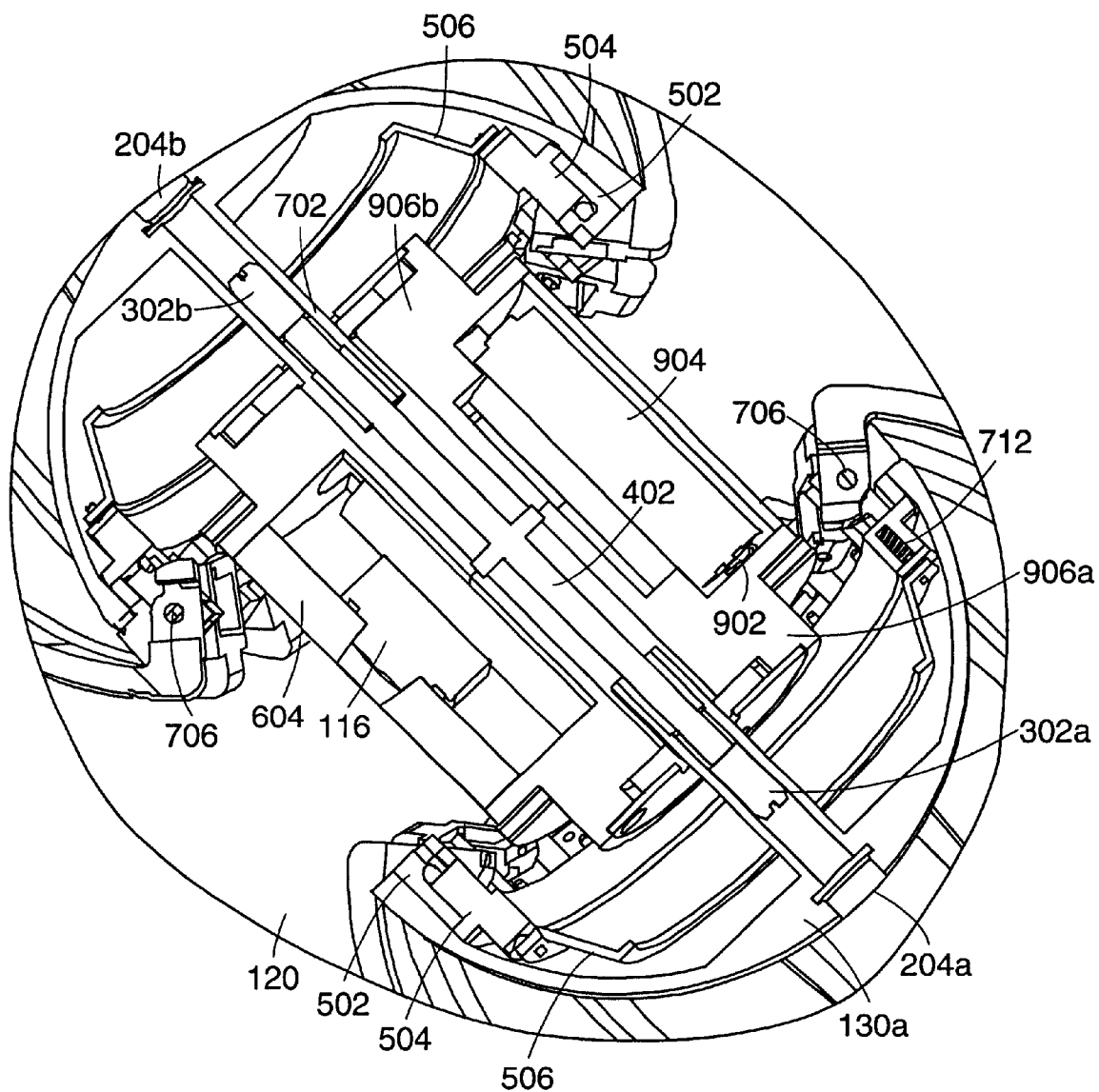

FIG. 11 is a front perspective view in section of the transformable vehicle of FIG. 1 in a transformed state 106. The first drive motor 406a and the second drive motor 406b are now visible and are located adjacent to the first and second distal ends of the central chassis assembly 114 and enclosed within wheel assemblies 110. With the hub caps 304 ejected in the transformed state, hub cap bores 204 are now visible. Electronic controls 408 are located within the central chassis assembly and are adjacent to the camera 116.

Figure 15:
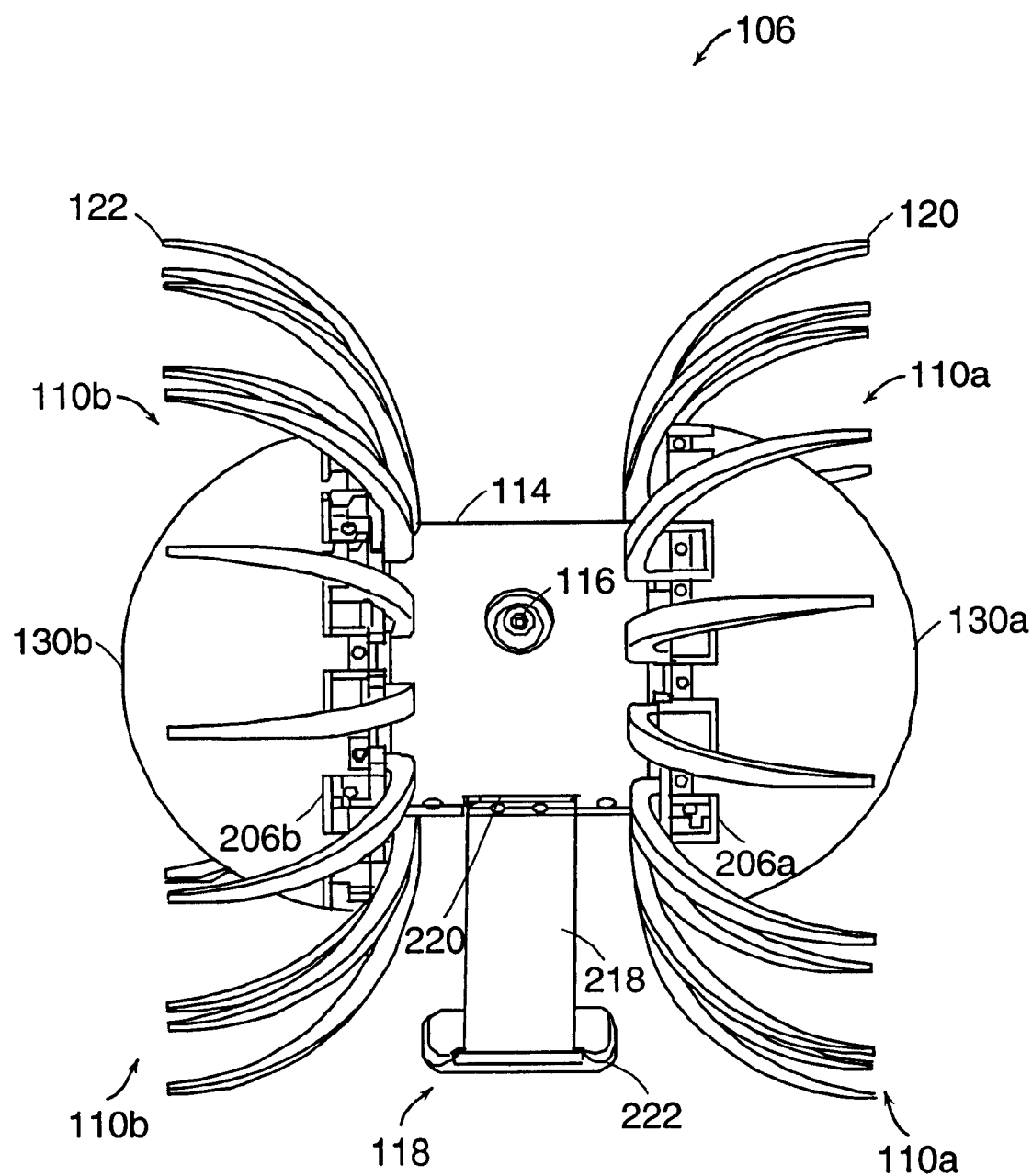
FIG. 15 is a front-view of the transformable vehicle of FIG. 1 in the transformed state.

FIG. 15 depicts a front view of one embodiment of the transformable vehicle 100 in the transformed state 106, according to an illustrative embodiment of the invention. Wheel assemblies 110 are fully extended along the longitudinal axis that passes through the distal ends of the central chassis assembly 114. Spines 120, 122 are fully extended away from outer shells. The tail retainer 220 provides an attachment for the tail assembly 118 to the central chassis assembly 114 and is clearly presented on the underside of the central chassis assembly 114.

Figure 16:
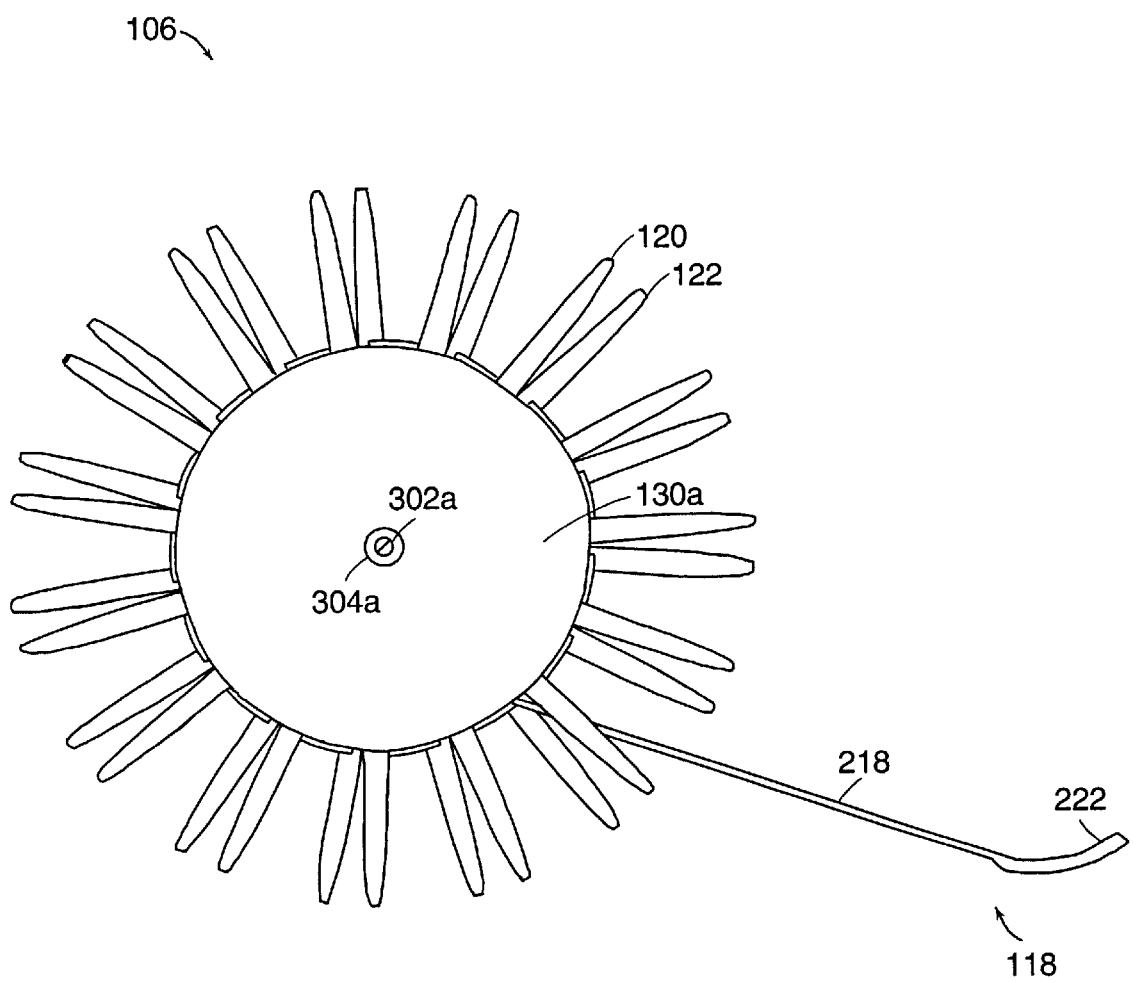
FIG. 16 is a side-view of the transformable vehicle of FIG. 1 in the transformed state.
Figure 17:
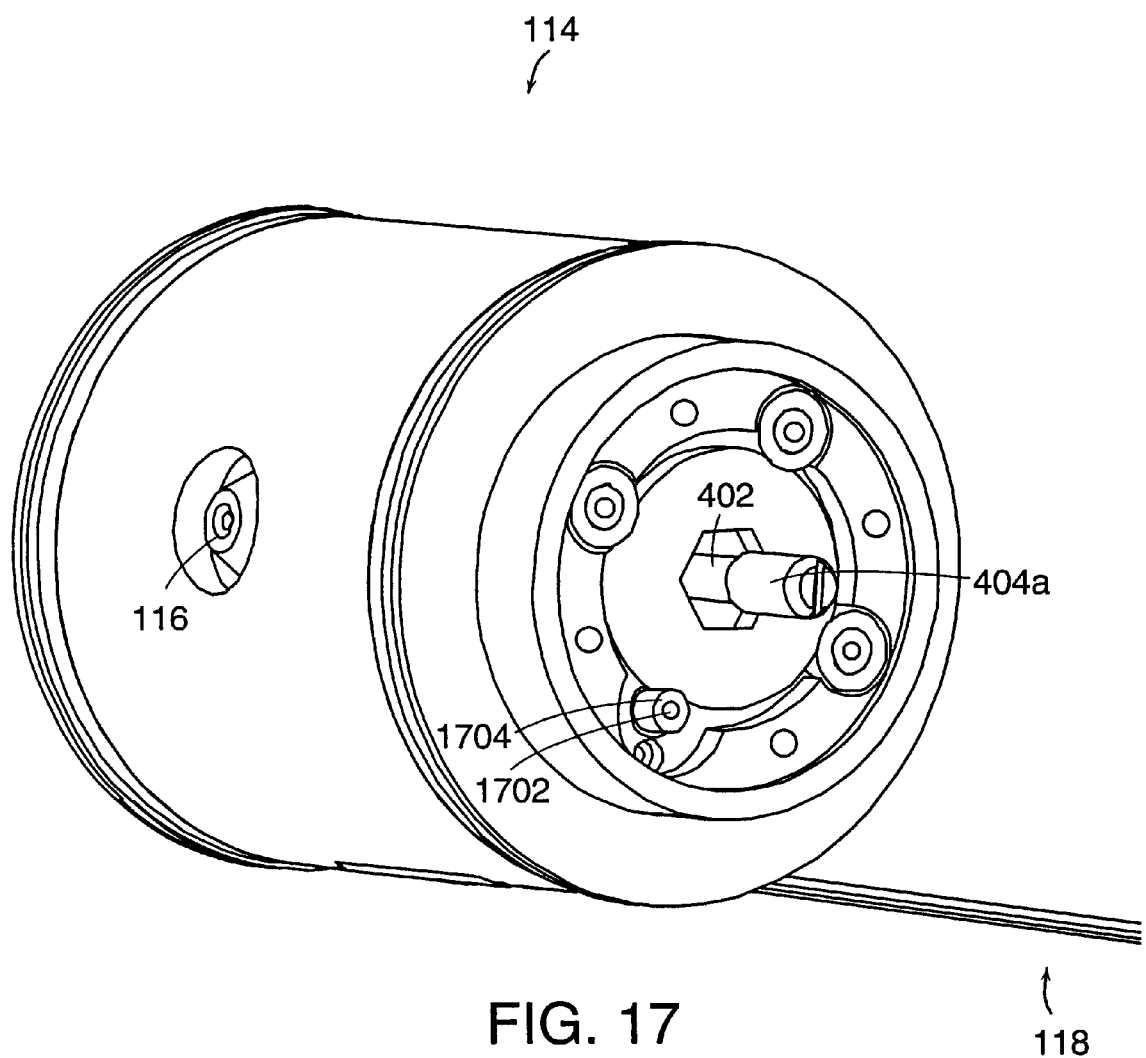
FIG. 17 is a front isometric view of the central chassis assembly of FIG. 6 with the main springs and gear cover removed.
Figure 18:
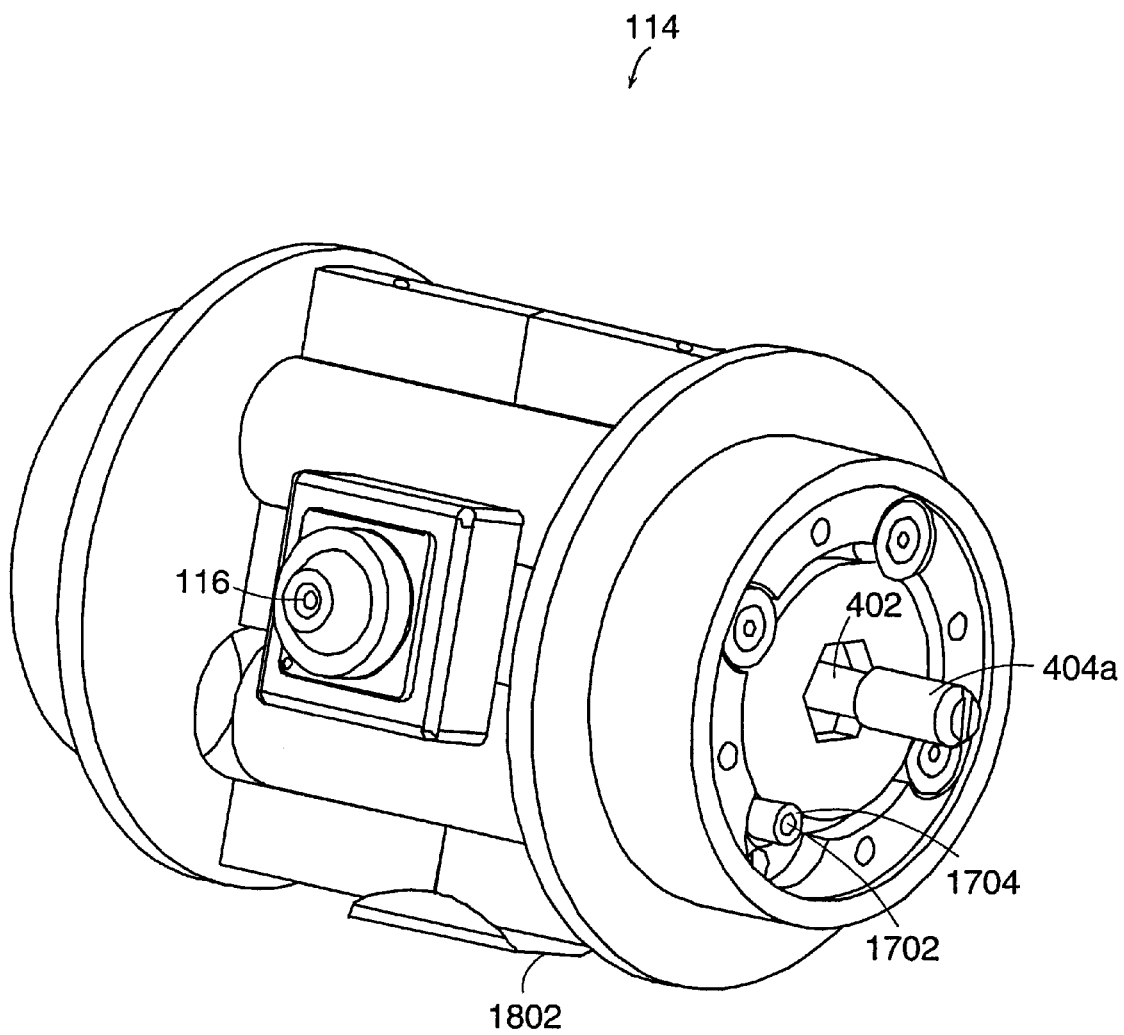
FIG. 18 is a front isometric view of the central chassis assembly of FIG. 6 with the thrust bearing assembly and the electronics cover removed.
Figure 19:
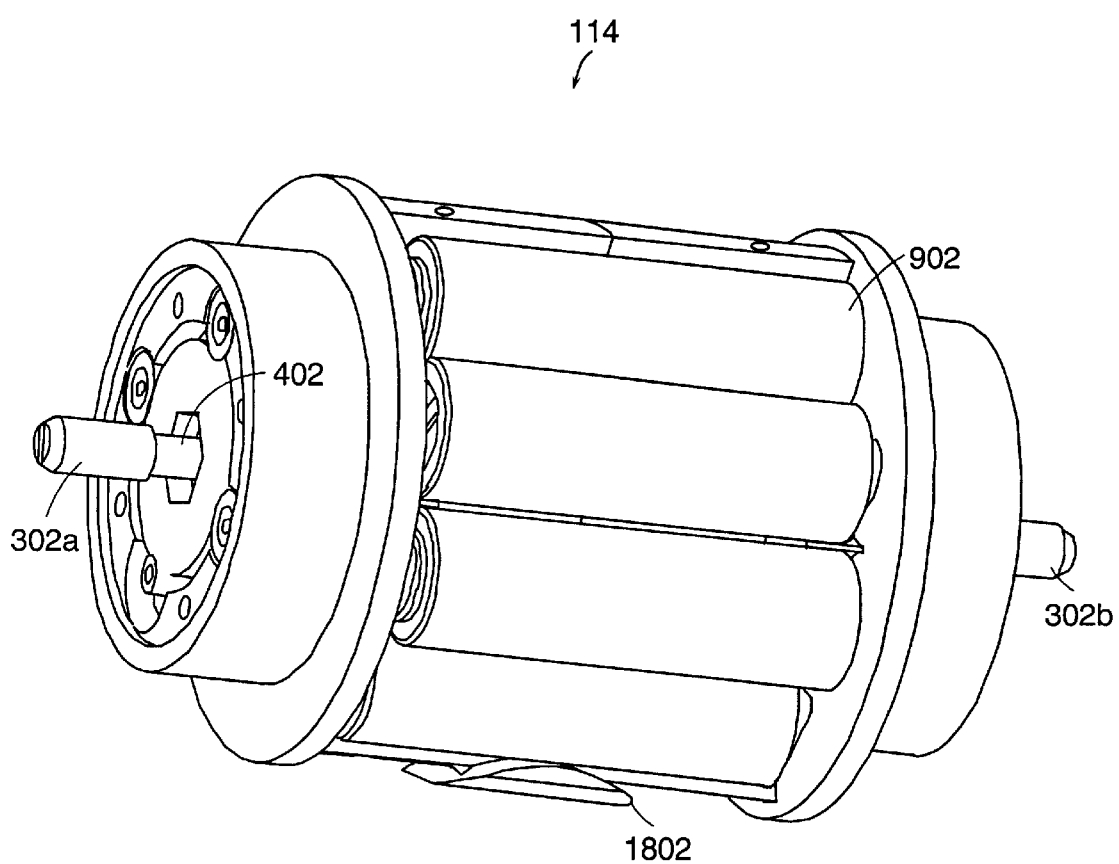
FIG. 19 is a rear-view of the central chassis assembly of FIG. 6 with the battery cover removed.
Figure 20:
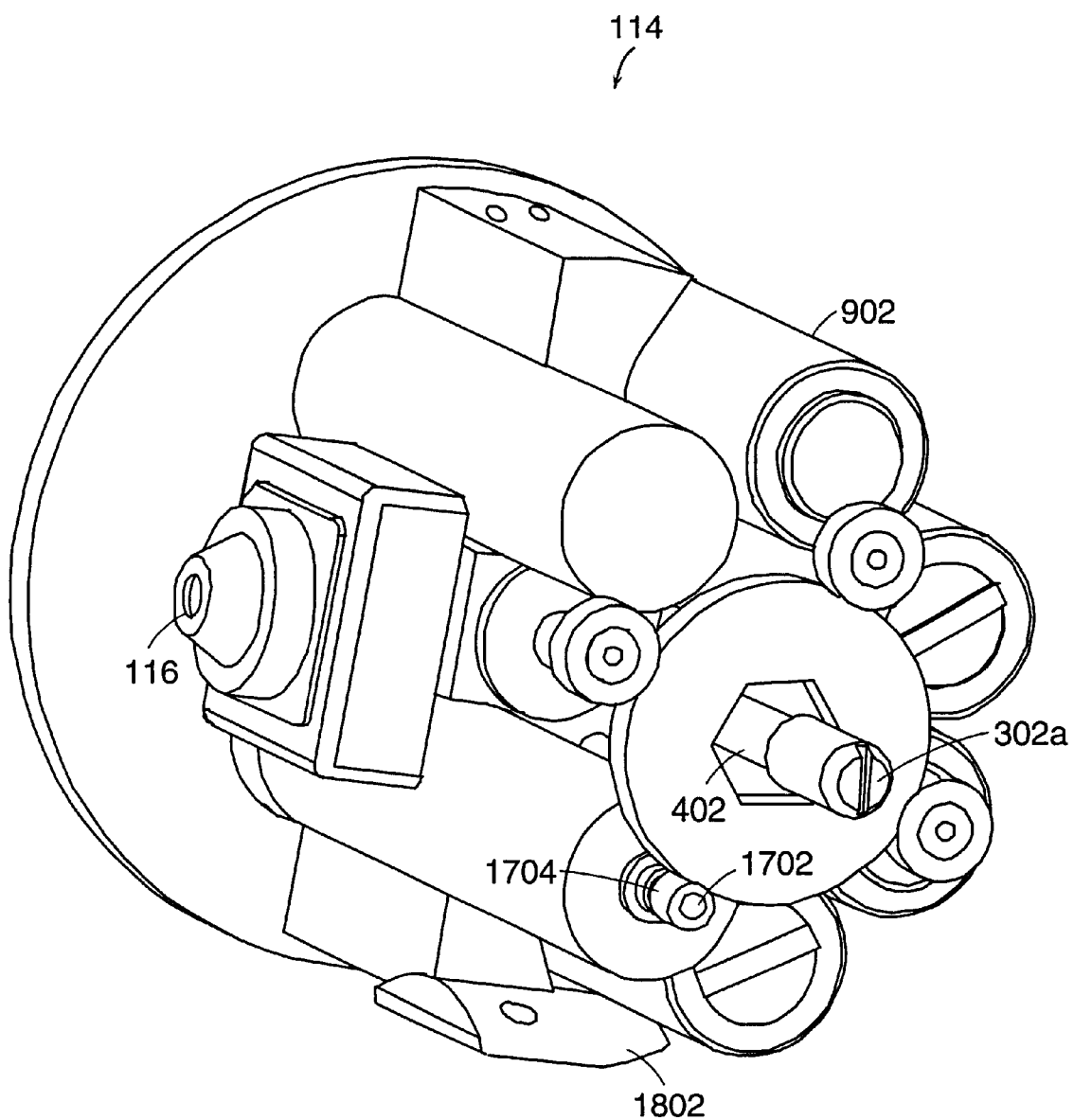
FIG. 20 is a front-view of the central chassis assembly of FIG. 6 with the left chassis removed.
Figure 21:
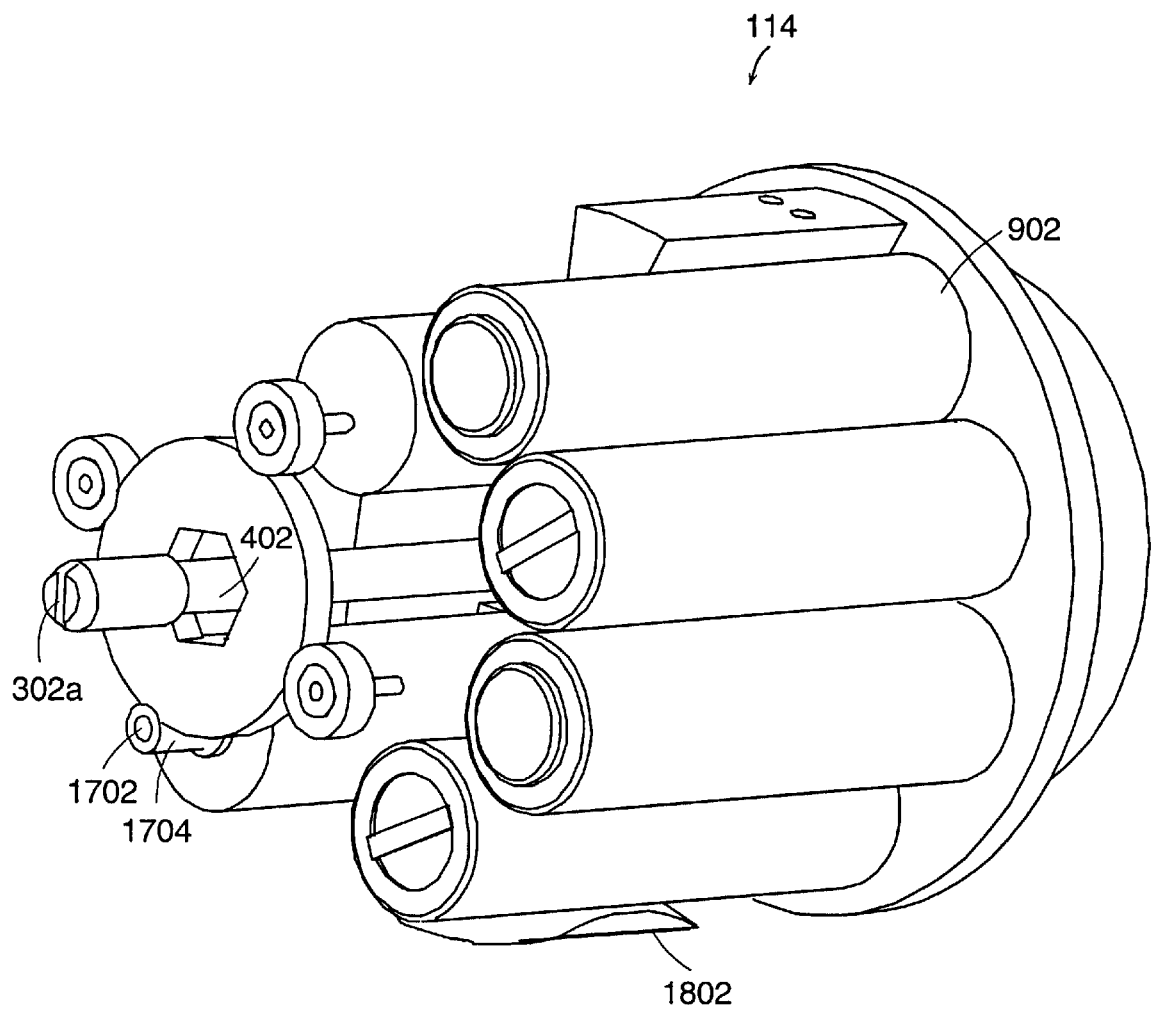
FIG. 21 is a rear-view of the central chassis assembly of FIG. 6 with the left chassis removed.

FIG. 16 depicts a side view of one embodiment of the transformable vehicle 100 in the transformed state. With the first hub cap 304a ejected, the first wheelnut 302a is now visible through the first hub cap bore 204a of the first outer shell assembly 130a extending therethrough. Similarly, with the second hub cap 304b ejected, the second wheelnut 302b is now visible through the first hub cap bore 204b of the second outer shell assembly 130b extending therethrough (not shown). Further, with reference to FIG. 16, the tail 218 is depicted in a fully extended and rearward position.

It is to be understood that the chassis assembly 114 contains the components of a vehicle necessary for carrying out mission objections. Such components include but are not limited to, batteries, motors, and/or engines. In some embodiments, as shown in FIGS. 9–13, such components include a power source, such as a battery 902, first drive motor 406a, second drive motor 406b, and control electronics 408. Preferably, the chassis assembly 114 further includes a mission objective element 116 which includes, but are not limited to, one or more of transceivers, sensors, cameras, audio speakers, microphones, on-board logic, acoustic transducers, gyroscopes, wheel assembly encoders, or other electronics. It is to be understood, however, that while preferable, a mission objective element is not necessary to the invention. For example, the sudden appearance of a moving, spiny, vehicle itself may be menacing enough to route barricaded individuals or distract a captor and enable hostage rescue.

Referring again to FIGS. 9–13, depicting components and assembly details of one embodiment of a transformable vehicle. A first area of the chassis assembly 906a is located proximate to first wheel assembly 110a. Similarly, a second area of the chassis assembly 906b is located proximate to second wheel assembly 110b. In one embodiment, the chassis assembly 114 may contain radios and receivers, additional sensors and electronics and other on-board logic (not shown). Further, in other embodiments, the chassis assembly 114 may contain a payload bay (not shown) which may hold, for example, medial supplies, munitions, ordinance, parachute, balloon, or a grappling hook and motorized winch assembly, or any other item that may aid a mission objective. In other embodiments, the payload bay holds a water propulsion unit, for example, a jet or propeller, for water surface or water submersible locomotion. The payload may further contain buoyancy control media, such as, for example, inflatable membranes to effect a neutral buoyancy or to cause stabilization at a desired water depth, or ballast.

In one embodiment, the payload bay comprises a water propulsion unit, such as a jet or propeller, for surface and/or submersible locomotion. Such a payload provides the transformable vehicle with amphibious capability. For example, a mission objective may lie across a lake, river or other body of water. In one embodiment, the user throws the transformable vehicle, in the stowed state, into the body of water. After the transformable vehicle deploys into the transformed state, it may then float on the surface, sink to a neutral buoyancy point, or sink to the bottom of the body of water; depending upon the vehicle architecture and/or material. For example, the vehicle may comprise inflatable membranes that ensure it will float, and/or the vehicle may contain ballast, either fixed or adjustable, that permit it to sink to a desired depth. On its own, or by a command from an operator, the transformable vehicle propels itself across the body of water with the water propulsion unit. Upon striking land, the transformable vehicle, either on its own or by a command from an operator, then proceeds to employ ground locomotion to its mission objective.

In another embodiment, the payload bay comprises a grappling hook and motorized winch assembly. Such an assembly provides the transformable vehicle with enhanced controlled vertical mobility in addition to its standard horizontal locomotion method. In another embodiment, a removable or detachable tail is incorporated with a grappling hook at its tip, the transformable vehicle is suspended from elevated structures or surfaces and raised or lowered via a cable connecting the tail and the chassis of the transformable vehicle. A motorized winch in the payload bay provides for raising and/or lowering the transformable vehicle. In addition, in one embodiment, the connection between the tail and chassis can be severed on command or in response to an environmental condition to release the transformable vehicle from the cable.

Figure 31:
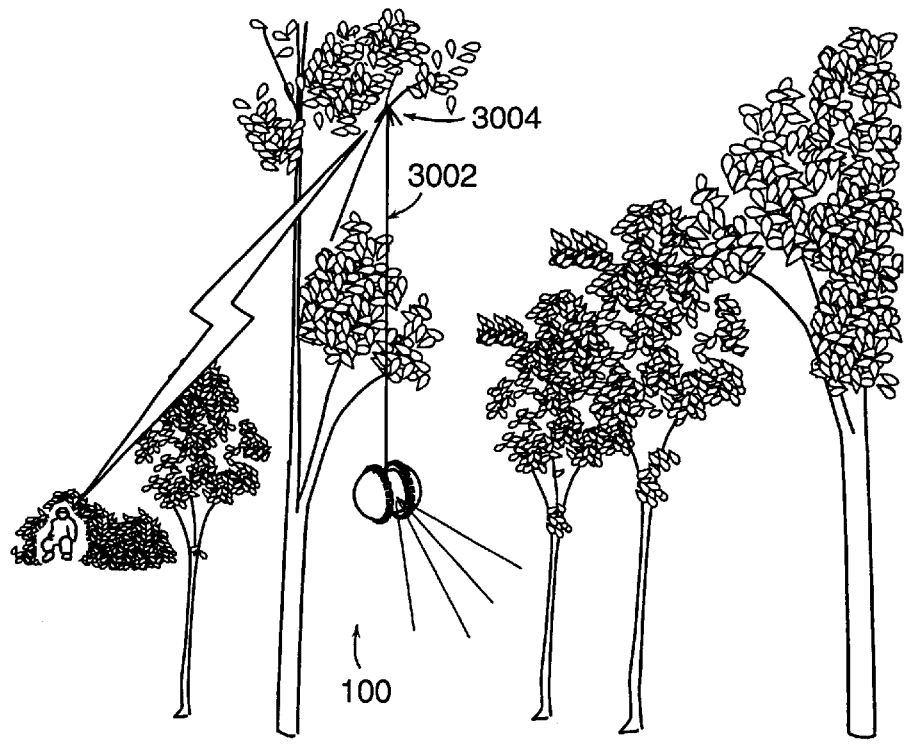
Figure 32:
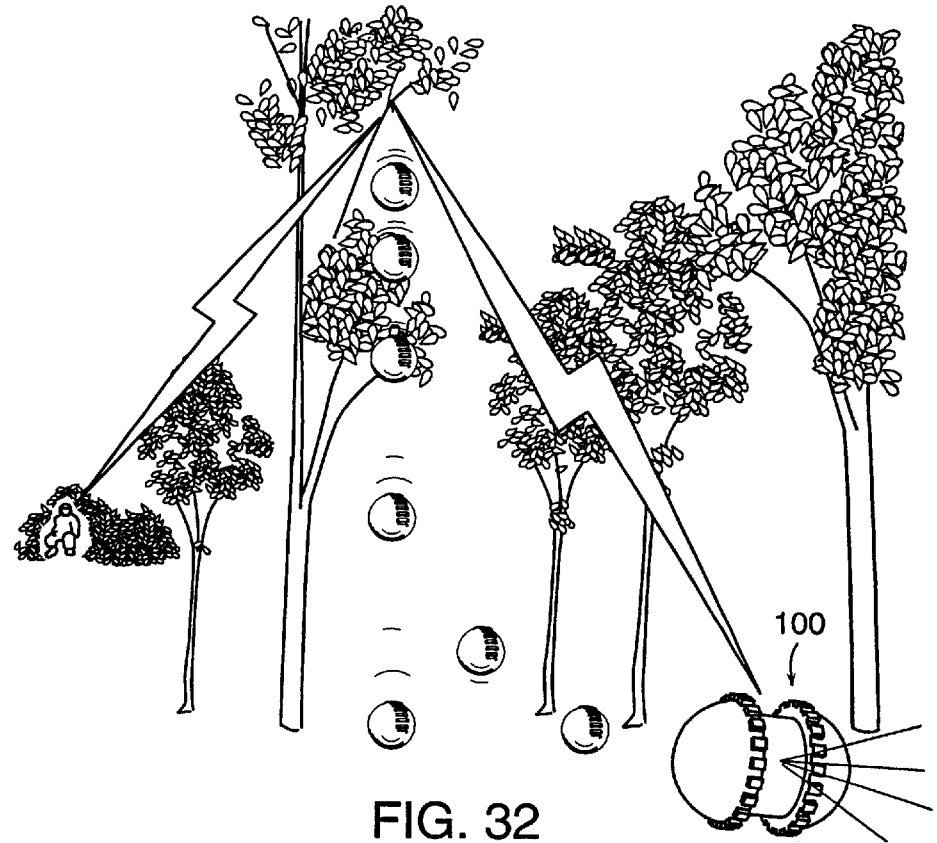

For example, FIGS. 29 through 32 depict the transformable vehicle performing covert and intrusive monitoring of under canopy activity. In one embodiment, such monitoring may be achieved as follows. The vehicle is deployed into tree canopy as shown in FIG. 29 by, for example, airdrop, ground launch, or throwing. The payload bay of the chassis assembly 114 deploys a winch 3002 tethered to a grappling hook 3004. The grappling hook 3004 anchors to branch of the tree canopy suspending the vehicle for surveillance as depicted in FIG. 31. The winch 3002 lowers or raises the suspended vehicle to improve view of monitored activity or enhance concealment. As shown in FIG. 32, the winch may be released from the grappling hook permitting the vehicle to drop to the ground for closer inspection of the monitored activity or sensor placement. The grappling hook 3004 may remain anchored to the tree branch to serve as a transponder or communications relay.

Figure 33:
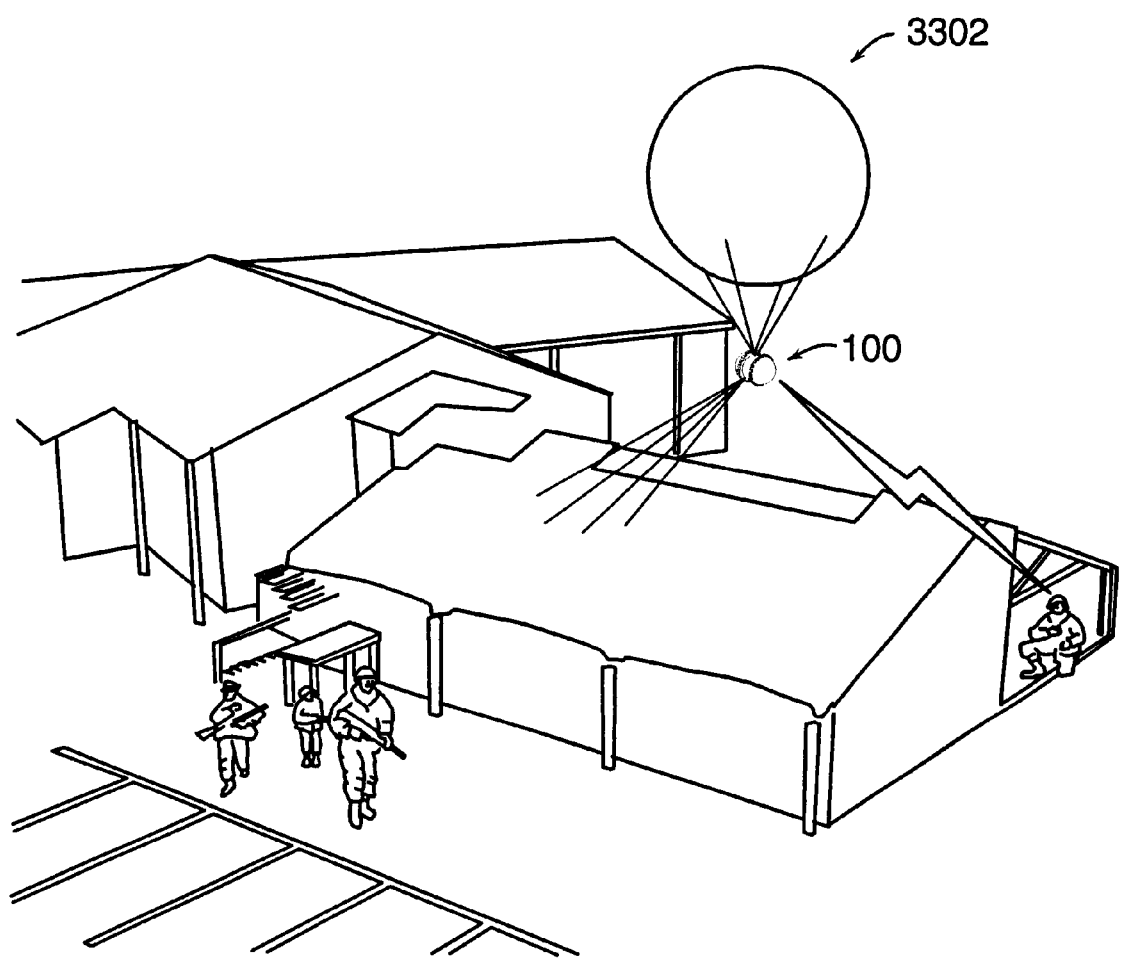
FIG. 33 depicts the transformable vehicle of FIG. 1 being used for high vantage point surveillance.
Figure 34:
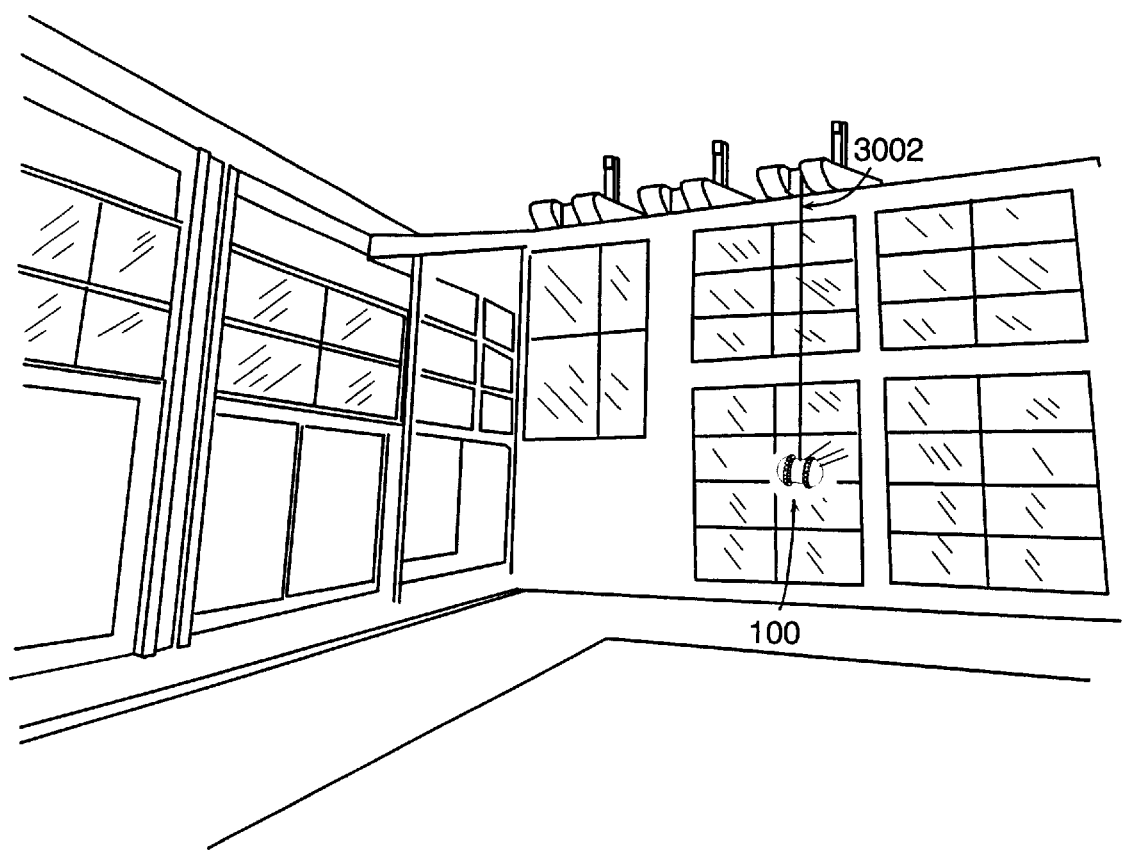
FIG. 34 depicts the transformable vehicle of FIG. 1 being used for surveillance of a building interior.

FIG. 33 depicts the vehicle performing high vantage point surveillance for aerial imagery above large buildings in outdoor environments. The vehicle is deployed and travels to the targeted area. A balloon 3302 is released from the payload bay of the chassis assembly 114 and inflated with hydrogen, helium, or other gas, by manual means or remote signal. When the vehicle reaches the desired surveillance location, aerial imagery and other data are sent back to operator. The hovering transformable vehicle may also be employed as a transponder or communications relay.

As described above, in another embodiment, a transformable vehicle in the transformed state may assemble with other transformable vehicle(s), also in the transformed state, to form a large vehicle. The assembly of two or more vehicles to form a larger vehicle is referred to as an assembled state of the transformable vehicle. The transformable vehicles may be assembled manually or remotely, for example, by remote control of the locomotion of the individuals transformable vehicles. In one embodiment, on the command of a user, or by the transformable vehicle itself, the transformable vehicles will locate each other and join together such that the chassis of one module connects to the end of the tail of the module in front of it. One embodiment of such an assembled state 2600 is illustrated in FIG. 26 where five transformed vehicles are shown assembled. In this fashion a larger vehicle is formed (the assembled state), made up of two or more transformable vehicles. The resulting assembled transformable vehicle is capable of surmounting larger obstacles because the lead vehicle is pushed up the obstacle by the vehicles behind it. In one embodiment, the point of connection between transformable vehicles (the end of the tail) may be hinged in one or more planes (as in a ball joint), or it may be rigid allowing the joint to carry a bending moment.

In the assembled state 2600, the transformable vehicle comprises a vehicle with generally greater mobility performance, such as with respect to vertical obstacles, than a individual transformable vehicle in the deployed state. As many modules as necessary or desired may be assembled to provide mobility over the terrain a user wishes to cross. In another embodiment, transformable vehicles in an assembled state may disassemble into one or more individual transformable vehicles. The transformable vehicles may be disassembled manually or remotely, for example, by remote control of the locomotion and/or a connection mechanism of the individual transformable vehicles. For example, a user may desire to assemble two or more transformable vehicles to cross difficult terrain but after the terrain is crossed disassemble the assembled transformable vehicles so that individual transformable vehicles may fan-out in several different directions, such as to form an extended communications relay.

FIGS. 27 through 34 depicts the transformable vehicle in a number of representative operating environments and mission objective scenarios. FIG. 27 depicts a throwing deployment of the vehicle through a window while in the stowed state. The vehicle may similarly be deployed through other access points of a targeted facility.

One of the key limitations for current teleoperated and semi-autonomous vehicles is the communication link (such as a radio or optical link) between the operator's control base station and the vehicle. Without continuous line-of-sight communications, the data stream to/from the vehicle is unreliable and, as a result, may put the vehicle's mission in jeopardy. The transformable vehicle enables an operator to overcome this limitation. In one embodiment, multiple transformable vehicles can be spaced apart in a "train" or "chain" to serve as a extendable communications relay for maintaining communications under non-line-of-sight-conditions. Referring to FIG. 28, in one embodiment, multiple vehicles are deployed to self organize into a communications train to penetrate a facility while maintaining communication signal strength. Following individual deployment, a plurality of vehicles may first organize into an assembled state, see for example, FIG. 26.

In one embodiment, the transformable vehicles of the train continue on their mission, either individually or with two or more in an assembled state, until a communication signal from the base station becomes weak. A first transformable vehicle is then stationed at the point where the base station transmission became weak and the remaining transformable vehicles continue on their mission until a communication signal from the first transformable vehicle becomes weak. A second transformable vehicle is then stationed at the point where the first transformable vehicle transmission became weak and the remaining transformable vehicles continue on their mission until a communication signal from the second transformable vehicle becomes weak. Similarly a third transformable vehicle is stationed at that point and the process is repeated until the transformable vehicles reach a desired point or the last transformable vehicle is stationed. In the above manner, a train or chain of transformable vehicles can serve as a mobile, and reconfigurable, relay between a base station and the last transformable vehicle(s) in the train. This multi-hop communication link can continue for many transformable vehicles and thus greatly extend the communication range between an individual transformable vehicle and the base station.

Each vehicle comprising the assembled state (FIG. 26) or communications train (FIG. 28) may be employed as specialized single purpose modules, such as, for example, hopper, sonar, infrared sensor or stereo camera. The overall effectiveness of the vehicles in the assembled state is markedly enhanced through the combined use of such specialized modules.

Figure 35:
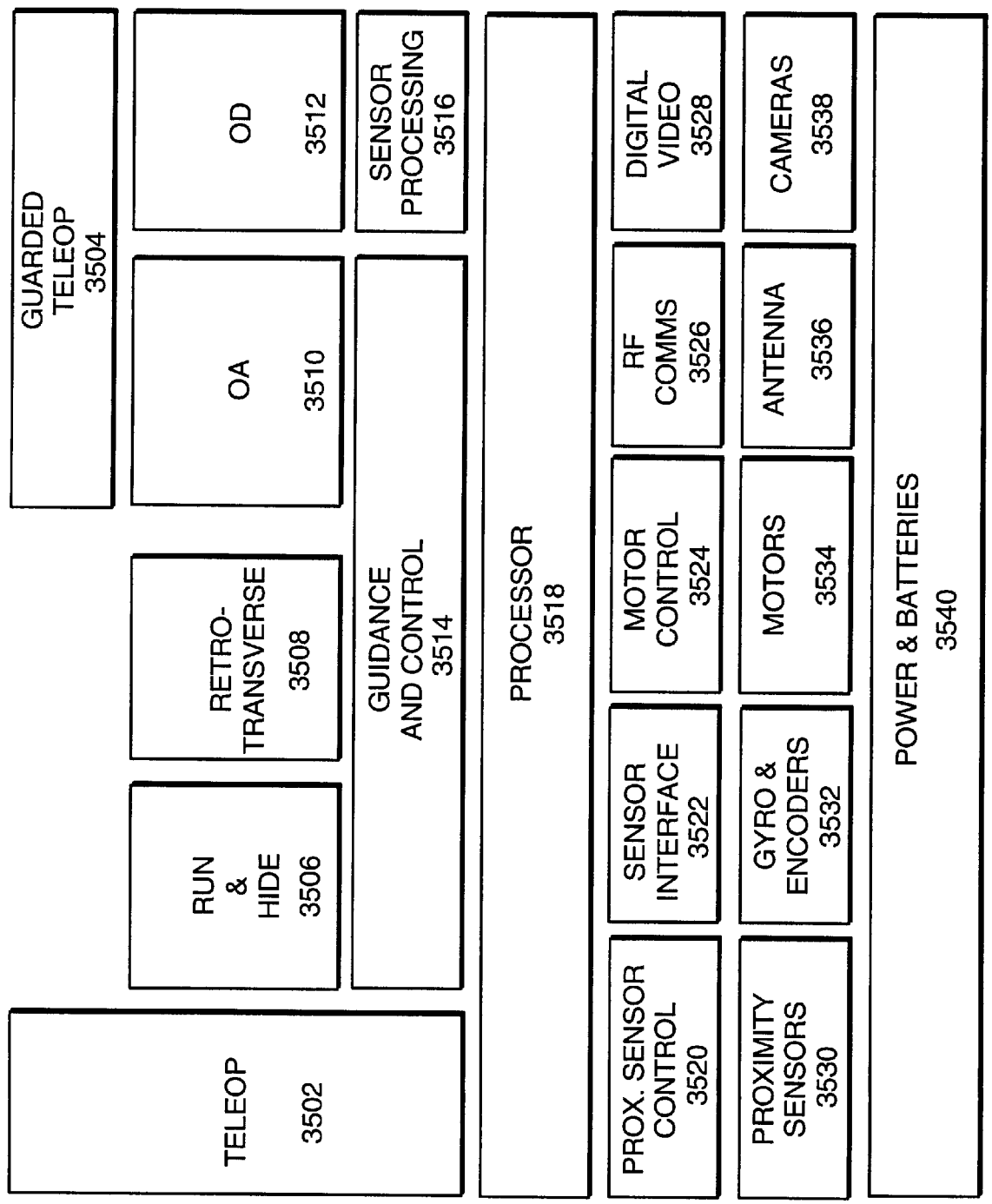
FIG. 35 outlines illustrative top level hardware architecture for the transformable vehicle of FIG. 1.

FIG. 35 is a high-level block diagram showing functions, behaviors, components, and processes of various embodiments of a transformable vehicle. The blocks are arranged such that exemplary functions and behaviors are indicated generally in the upper area and exemplary physical components and processes are indicated in the lower area. Functions and behaviors include guidance and control 3514 which provides non-autonomous and semi-autonomous modes of control. Many of functions, behaviors, components and processes are well known in the art.

Teleop 3502 is an example of a non-autonomous mode of control comprising providing video and other inputs from on-board sensors to a remote operator for guided operation and control of the transformable vehicle at a distance. Modes of autonomous control include guarded teleop 3504, run & hide 3506, retrotraverse 3508, obstacle avoidance 3510, and obstacle detection 3512 which provide additional automated programmed behaviors of the transformable vehicle. The behavior characterized by guarded teleop 3504 includes a semi-autonomous mode of control for the transformable vehicle where the transformable vehicle may react and respond to input from on-board sensors which indicate imminently hazardous or threatening conditions. The behavior characterized by retrotraverse 3508 includes a semi-autonomous behavioral mode where the transformable vehicle returns from a mission waypoint to an original location along the identical path of travel. The behavior characterized by run & hide 3506 includes a semi-autonomous behavioral mode where the transformable vehicle retreats from a threatening environment to a more secure location. Any of the discussed control modes may also comprise the semi-autonomous behavioral modes of obstacle avoidance 3510 and/or obstacle detection 3512 for either automatically avoiding or detecting obstacles as determined by on-board sensors and obviating the need for remote operation for such function.

A number of exemplary component and component controls for interfacing with the sensor processing unit 3516 and providing data input to the processor 3518 are shown including, for example, proximity sensors 3530 and proximity sensor control 3520, gyroscope and encoders 3522 and an associated sensor interface 3522, motors 3534 and motor controllers 3524, antenna 3536 and an associated RF communication package 35256 and finally, cameras 3538 and digital video 3528. One or more of these components and controls are discussed further in FIG. 36 below. The power and batteries component 3540 are shown schematically along the bottom area of FIG. 35.

Figure 36:
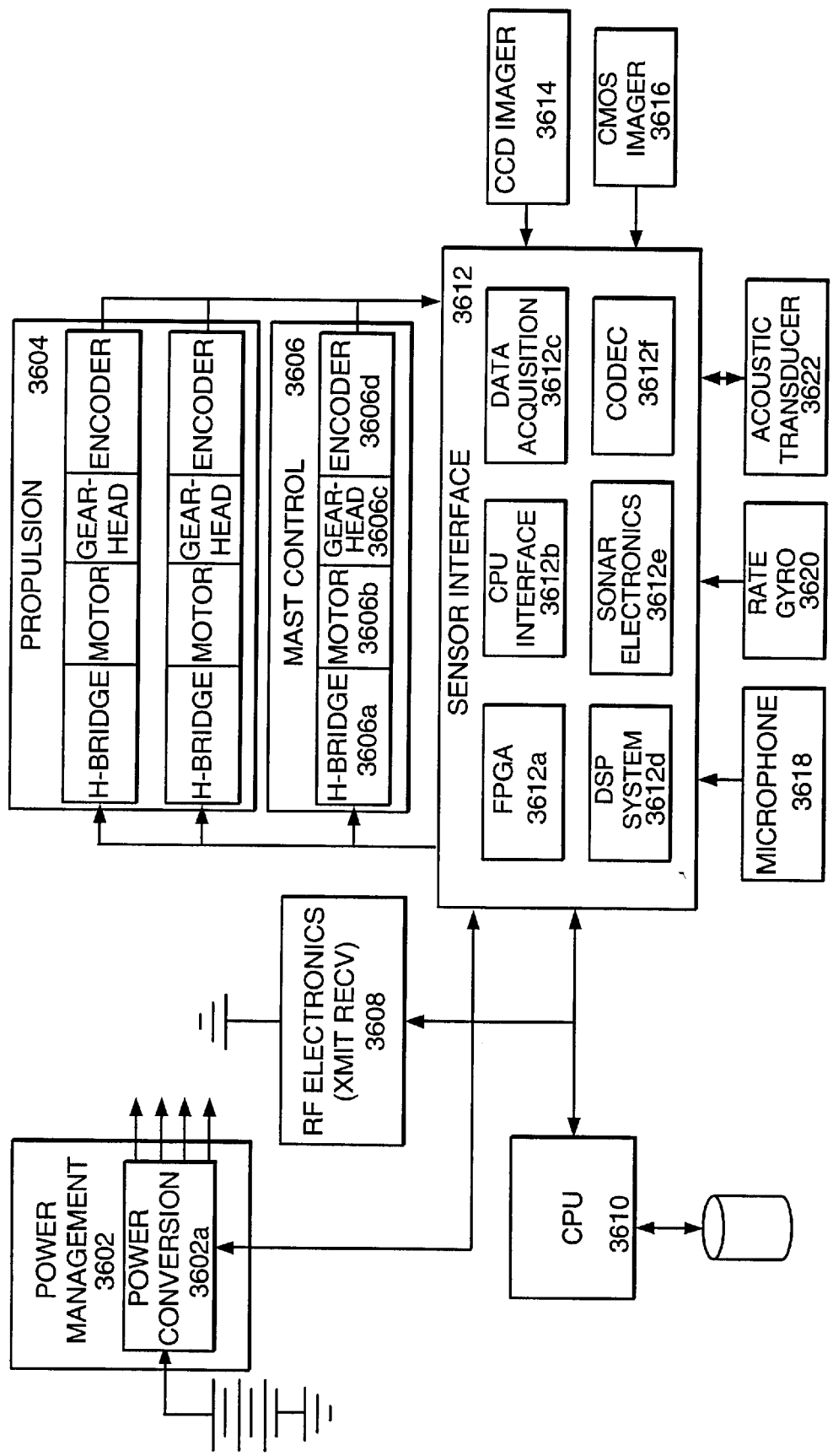
FIG. 36 is a block level diagram of the physical elements and operations of the transformable vehicle of FIG. 1.

FIG. 36 is an exemplary hardware schematic of the transformable vehicle in one embodiment. Many of the functions and features of the hardware components shown are well known in the art. Major hardware component groups include power management 3602, propulsion 3604, antennae array or mast and control thereof 3606, RF (radio frequency) electronics 3608, CPU (central processing unit) 3610, sensor interface 3612, and one or more sensors 3614 through 3622. Power management 3602 includes, for example, one or more batteries and means for conversion of the battery output to different voltage levels 3602a. Propulsion and mast control block 3604 includes an H-Bridge 3604a, 3606a, motor 3604b, 3606b, gear-head 3604c, 3606c and encoders elements 3604d, 3606d. The H-Bridge 3604a, 3606a provides a control circuit configuration for the motor 3604b, 3606b and allows the polarity of the power applied to each motor winding to be controlled independently. The gearhead 3604c, 3606c includes a transmission component for conversion of the output torque of the motor. The encoder 3604d, 3606d and a servo loop (not shown) built into each motor provide measurement and storage of motor rotation data and overall displacement of the transformable vehicle.

The sensors interface 3612 or bus may include an FPGA (field-programmable gate array 3612a, a CPU interface 3612b, data acquisition component 3612c, a DSP 3612d (digital signal processing), sonar electronics 3612e, and a CODEC (compressor/decompressor) 3612f. The FPGA 3612a is a class of high capacity field programmable devices for readily adaptable integrated circuit implementation. The CPU interface 3612b, data acquisition component 3612c and DSP 3612d receive and digitize sensor input data for processing by the CPU 3610. The CODEC 3612f provides optimal data transmission rates by compression and decompression of data sent between the sensors and sensor interface 3612 and CPU 3610. The SONAR electronics 3612e sends the requisite "ping" trigger to SONAR 3622 (discussed below). The RF electronics 3608 provide for receiving and transmission of radio signals to a remote operator or a base station. The RF electronics 3608 may be linked with other components, for example, propulsion control 3604 and the CMOS imager 3616, for remote operation of the transformable vehicle in the non-autonomous teleop mode 3502 or semi-autonomous guarded teleop mode 3504 (refer to FIG. 35).

The sensors on-board the transformable vehicle may include a CCD (couple charged device) imager 3614, CMOS (complementary metal oxide semiconductor) imager 3616, SONAR 3622, rate gyro 3620, and a microphone 3618. The CCD imager 3614 and/or the CMOS imager 3616 provide visual data and the microphone 3618 and SONAR 3622 provide acoustical data to the sensor interface 3612. The rate gyro 3620 or gyroscope provides navigational guidance data to the sensor interface 3612 for processing by the CPU 3610.

The invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims rather than by the foregoing description, and all changes which come within the meaning and range of equivalency of the claims are therefore intended to be embraced herein.

What is claimed is:

1. A transformable vehicle comprising,
   a central chassis assembly having first and second distal ends with an axis passing therebetween,
   a first wheel assembly mounted to said first distal end of said central chassis assembly and adapted to move along said axis from a stowed state to a transformed state, and
   a second wheel assembly mounted to said second distal end of said central chassis assembly and adapted to move along said axis from a stowed state to a transformed state, wherein
      said vehicle is substantially parallelpipedal in said stowed state.

2. A transformable vehicle comprising,
   a central chassis assembly having first and second distal ends with an axis passing therebetween,
   a first wheel assembly mounted to said first distal end of said central chassis assembly and adapted to move along said axis from a stowed state to a transformed state,
   a second wheel assembly mounted to said second distal end of said central chassis assembly and adapted to move along said axis from a stowed state to a transformed state, wherein
      said first wheel assembly comprises a first outer shell assembly adapted to overlap a first portion of said central chassis assembly, and
      said second wheel assembly comprises a second outer shell assembly adapted to overlap a second portion of said central chassis assembly.

3. A transformable vehicle according to claim 2, wherein said first outer shell assembly includes a first substantially hemispherical outer shell, and said second outer shell assembly includes a second substantially hemispherical outer shell.

4. A transformable vehicle comprising,
   a central chassis assembly having first and second distal ends with an axis passing therebetween,
   a first wheel assembly mounted to said first distal end of said central chassis assembly and adapted to move along said axis from a stowed state to a transformed state,
   second wheel assembly mounted to said second distal end of said central chassis assembly and adapted to move along said axis from a stowed state to a transformed state, and
   a drive motor assembly adapted to develop a differential torque between said first wheel assembly and said second wheel assembly.

5. A transformable vehicle according to claim 4, wherein said drive motor assembly is adapted to develop a first differential torque between said central chassis assembly and said first and second wheel assemblies.

6. A transformable vehicle according to claim 4 wherein said drive motor assembly further comprises,
   a first drive motor assembly adapted to develop a differential torque between said central chassis assembly and said first wheel assembly, and a second drive motor assembly adapted to develop a differential torque between said central chassis assembly and said second wheel assembly.

7. A transformable vehicle according to claim 5, further comprising a tail assembly attached to said central chassis assembly and adapted to provide a reaction torque to said first differential torque.

8. A transformable vehicle according to claim 7, wherein said tail assembly includes a distal end adapted for attachment to a grappling hook.

9. A transformable vehicle according to claim 7, wherein said tail assembly is further adapted to mate with a mating portion on an additional transformable vehicle, comparable to said transformable vehicle, to form a single larger vehicle.

10. A transformable vehicle according to claim 9, wherein said transformable vehicle is further adapted to locomote in concert with at least one said additional transformable vehicle.

11. A transformable vehicle comprising,
a central chassis assembly having first and second distal ends with an axis passing therebetween,
a first wheel assembly mounted to said first distal end of said central chassis assembly and adapted to move along said axis from a stowed state to a transformed state,
a second wheel assembly mounted to said second distal end of said central chassis assembly and adapted to move along said axis from a stowed state to a transformed state,
a first plurality of spines each having first and second distal ends and being mounted to said first wheel assembly at said first distal end, and
a second plurality of spines each having first and second distal ends and being mounted to said second wheel assembly at said first distal end.

12. A transformable vehicle according to claim 11, wherein
said first plurality of spines is further adapted to be movably mounted to said first wheel assembly, and
said second plurality of spines is further adapted to be movably mounted to said second wheel assembly.

13. A transformable vehicle according to claim 11, wherein said first and said second plurality of spines are substantially inflexible.

14. A transformable vehicle according to claim 11, wherein
said first wheel assembly includes a first circumferential edge adapted for said mounting of said first plurality of spines, and
said second wheel assembly includes a second circumferential edge adapted for said mounting of said second plurality of spines.

15. A transformable vehicle according to claim 11, wherein
said first plurality of spines is further adapted to be positioned proximate to said first wheel assembly in said stowed state, and
said second plurality of spines is further adapted to be positioned proximate to said second wheel assembly in said stowed state.

16. A transformable vehicle according to claim 11, wherein
said first plurality of spines is further adapted to be positioned at least partially radially extending from said first wheel assembly in said transformed state, and
said second plurality of spines is further adapted to be positioned at least partially radially extending from said second wheel assembly in said transformed state.

17. A transformable vehicle according to claim 11, wherein
said first wheel assembly has a first outer surface and said first plurality of spines is contoured to be positioned adjacent to said first outer surface in said stowed state, and
said second wheel assembly has a second outer surface and said second plurality of spines is contoured to be positioned adjacent to said second outer surface in said stowed state.

18. A transformable vehicle according to claim 11, further adapted to be configured in a transformed state, and further comprising,
a first mounting mechanism adapted to mount said first plurality of spines to said first wheel assembly and including a spring bias adapted to bias said first plurality of spines in a radially extended position in said transformed state, and
a second mounting mechanism adapted to mount said second plurality of spines to said second wheel assembly and including a spring bias adapted to bias said second plurality of spines in a radially extended position in said transformed state.

19. A transformable vehicle according to claim 11, wherein at least one of said first and said second plurality of spines is further adapted to radially extend and retract.

20. A transformable vehicle according to claim 11, further comprising a spine control motor assembly, adapted to radially extend and retract at least one of said first plurality of spines and said second plurality of spines.

21. A transformable vehicle according to claim 11, wherein said first plurality of spines and said second plurality of spines are further adapted to articulate to enable said transformable vehicle to locomote.

22. A transformable vehicle according to claim 11, wherein said first plurality of spines is further adapted to articulate in a first succession and said second plurality of spines is further adapted to articulate in a second succession to develop a rotational torque between said first plurality of spines and said second plurality of spines.

23. A transformable vehicle according to claim 11, further adapted to uniformly articulate at least one of said first and said second plurality of spines.

24. A transformable vehicle according to claim 11, wherein at least one of said first plurality of spines and said second plurality of spines is further adapted to articulate to conform to a terrain profile over which said transformable vehicle is travelling.

25. A transformable vehicle according to claim 11, wherein at least one of said first plurality of spines and said second plurality of spines are further adapted to flex to conform to a terrain profile over which the said transformable vehicle is travelling.

26. A transformable vehicle according to claim 20, wherein said spine control motor assembly is further adapted to radially extend and retract at least one of said first plurality of spines and said second plurality of spines to conform to said terrain.

27. A transformable vehicle comprising,
a central chassis assembly having first and second distal ends with an axis passing therebetween,
a first wheel assembly mounted to said first distal end of said central chassis assembly and adapted to move along said axis from a stowed state to a transformed state, a second wheel assembly mounted to said second distal end of said central chassis assembly and adapted to move along said axis from a stowed state to a transformed state, and said central chassis further comprises at least of one of a wireless transmitter and a wireless receiver, sensor and camera.

28. A transformable vehicle according to claim 27, wherein said camera comprises at least of one of a CCD camera, video camera, motion camera, infrared camera, and digital camera.

29. A transformable vehicle comprising, a central chassis assembly having first and second distal ends with an axis passing therebetween, a first wheel assembly mounted to said first distal end of said central chassis assembly and adapted to move along said axis from a stowed state to a transformed state, and a second wheel assembly mounted to said second distal end of said central chassis assembly and adapted to move along said axis from a stowed state to a transformed state, wherein said transformable vehicle is adapted to mate with at least one additional transformable vehicle, comparable to said transformable vehicle, to form a single larger vehicle.

30. A transformable vehicle comprising, a central chassis assembly having first and second distal ends with an axis passing therebetween, a first wheel assembly mounted to said first distal end of said central chassis assembly and adapted to move along said axis from a stowed state to a transformed state, and a second wheel assembly mounted to said second distal end of said central chassis assembly and adapted to move along said axis from a stowed state to a transformed state, wherein said transformable vehicle is adapted for wireless communication with at least one additional transformable vehicle located at a first location and a base station located at a second location, to enable said base station to communicate wirelessly with said additional transformable vehicle through said transformable vehicle.

31. A transformable vehicle comprising, a central chassis assembly having first and second distal ends with an axis passing therebetween, a first wheel assembly mounted to said first distal end of said central chassis assembly and adapted to move along said axis from a stowed state to a transformed state, a second wheel assembly mounted to said second distal end of said central chassis assembly and adapted to move along said axis from a stowed state to a transformed state, and a tail assembly having a first distal end attached to said central chassis assembly and a second distal end adapted for attachment to a tail weight.

32. A transformable vehicle comprising, a central chassis assembly having first and second distal ends with an axis passing therebetween, a first wheel assembly mounted to said first distal end of said central chassis assembly and adapted to move along said axis from a stowed state to a transformed state, a second wheel assembly mounted to said second distal end of said central chassis assembly and adapted to move along said axis from a stowed state to a transformed state, a first spring assembly adapted to engage said first wheel assembly and to bias said first wheel assembly along said axis from said stowed state into said transformed state, and a second spring assembly adapted to engage said second wheel assembly and to bias said second wheel assembly along said axis from said stowed state into said transformed state.

33. A transformable vehicle comprising, a central chassis assembly having first and second distal ends with an axis passing therebetween, a first wheel assembly mounted to said first distal end of said central chassis assembly and adapted to move along said axis from a stowed state to a transformed state, a second wheel assembly mounted to said second distal end of said central chassis assembly and adapted to move along said axis from a stowed state to a transformed state, and control electronics adapted to substantially autonomously control operation of said transformable vehicle.

34. A transformable vehicle comprising, a central chassis assembly having a sensor and having first and second distal ends with an axis passing therebetween, a first wheel assembly mounted to said first distal end of said central chassis assembly and adapted to move along said axis from a stowed state to a transformed state, a second wheel assembly mounted to said second distal end of said central chassis assembly and adapted to move along said axis from a stowed state to a transformed state, wherein said first wheel assembly is rotatably mounted to said first distal end of said central chassis assembly, and said second wheel assembly is rotatably mounted to said second distal end of said central chassis assembly, and wherein said central chassis assembly is adapted for rotation about said axis to change an orientation of said sensor.

35. A transformable vehicle comprising, a central chassis assembly having first and second distal ends with an axis passing therebetween, a first wheel assembly mounted to said first distal end of said central chassis assembly and adapted to move along said axis from a stowed state to a transformed state, and second wheel assembly mounted to said second distal end of said central chassis assembly and adapted to move along said axis from a stowed state to a transformed state, wherein said central chassis is radially symmetric about said axis in a stowed state.

36. A transformable vehicle according to claim 35, wherein said vehicle is substantially cylindrical in said stowed state.

37. A transformable vehicle according to claim 35, wherein said vehicle is substantially spherical in said stowed state.

38. A transformable vehicle according to claim 35, wherein said vehicle is substantially oblate spherical in said stowed state.

39. A transformable vehicle comprising,
a central chassis assembly having first and second distal ends with an axis passing therebetween,
a first wheel assembly mounted to said first distal end of said central chassis assembly and adapted to move along said axis from a stowed state to a transformed state,
a second wheel assembly mounted to said second distal end of said central chassis assembly and adapted to move along said axis from a stowed state to a transformed state, and
a payload bay disposed in said central chassis.

40. A transformable vehicle according to claim 39, wherein said payload bay is adapted to house at least one of sensors, cameras, wireless communication devices, medical supplies, munitions, and ordinances.

41. A transformable vehicle according to claim 39, wherein said payload bay is adapted to house a grappling hook and a motorized winch assembly wherein said motorized winch assembly is adapted to perform at least extending and retracting said grappling hook.

* * * * *